United States Patent
Radu et al.

(10) Patent No.: US 12,510,663 B1
(45) Date of Patent: Dec. 30, 2025

(54) OBSTACLE DETECTION AND LOCALIZATION OF AERIAL VEHICLES USING ACTIVE OR PASSIVE SONAR

(71) Applicant: Amazon Technologies, Inc., Seattle, WA (US)

(72) Inventors: Valentin Radu, Buchare (RO); Lorenzo Sorgi, Berlin (DE); Rada-Amalia Cifor, Cluj-Napoca (RO)

(73) Assignee: Amazon Technologies, Inc., Seattle, WA (US)

( * ) Notice: Subject to any disclaimer, the term of this patent is extended or adjusted under 35 U.S.C. 154(b) by 100 days.

(21) Appl. No.: 18/066,095

(22) Filed: Dec. 14, 2022

(51) Int. Cl.
| | |
|---|---|
| *G01S 15/93* | (2020.01) |
| *B64U 10/14* | (2023.01) |
| *H04R 1/40* | (2006.01) |
| *B64U 101/70* | (2023.01) |

(52) U.S. Cl.
CPC ............. *G01S 15/93* (2013.01); *B64U 10/14* (2023.01); *H04R 1/406* (2013.01); *B64U 2101/70* (2023.01)

(58) Field of Classification Search
CPC ..... G01S 15/93; B64U 10/14; B64U 2101/70; H04R 1/406
See application file for complete search history.

(56) References Cited

U.S. PATENT DOCUMENTS

| | | | |
|---|---|---|---|
| 10,101,443 B1 | 10/2018 | LeGrand, III et al. | |
| 10,959,018 B1* | 3/2021 | Shi | G06N 20/00 |
| 11,754,708 B1 | 9/2023 | Durand et al. | |
| 11,858,625 B1 | 1/2024 | Eisenmann et al. | |
| 12,181,615 B2* | 12/2024 | Yartsev | G01S 15/93 |
| 2015/0160658 A1* | 6/2015 | Reedman | G01S 15/06 701/3 |
| 2017/0219686 A1 | 8/2017 | Xie et al. | |
| 2017/0274979 A1 | 9/2017 | Beckman et al. | |

(Continued)

OTHER PUBLICATIONS

Go, Yeong-Ju and Jong-Soo Choi. "An Acoustic Source Localization Method Using a Drone-Mounted Phased Microphone Array." Drones 5.3 (2021): 75, 18 pages, URL: https://www.mdpi.com/2504-446X/5/3/75.

(Continued)

*Primary Examiner* — Navid Z. Mehdizadeh
*Assistant Examiner* — Matthew Ho
(74) *Attorney, Agent, or Firm* — Athorus, PLLC

(57) ABSTRACT

An aerial vehicle configured for operating within indoor or outdoor spaces is equipped with acoustic sensors for detecting reflections of sound, or echoes, from objects. Distances and bearings to such objects may be calculated based on such echoes. The echoes may be reflections of sound actively emitted by the aerial vehicle, such as by a speaker, or sound radiating from operating components aboard the aerial vehicle, such as rotating motors or propellers. The echoes may be captured by multiple sensors such as microphones provided around the aerial vehicle and used to calculate distances or bearings to the objects, such as by trilateration, triangulation, or in any other manner. Such distances or bearings may also be utilized along with distances or bearings determined from cameras, range sensors, or other systems, and used to generate a navigation map of the space, or compared to a navigation map generated for that space.

26 Claims, 32 Drawing Sheets

(56) References Cited

U.S. PATENT DOCUMENTS

2018/0196435 A1     7/2018   Kunzi et al.
2020/0062378 A1     2/2020   Li et al.
2022/0343241 A1*   10/2022   Jha ........................ G08G 1/166

OTHER PUBLICATIONS

Wang, Lin and Andrea Cavallaro. "Acoustic Sensing from a Multi-Rotor Drone." IEEE Sensors Journal 18.11 (2018): 4570-4582, URL: https://www.researchgate.net/publication/324468964_Acoustic_Sensing_From_a_Multi-Rotor_Drone.

* cited by examiner

AERIAL VEHICLE CAPTURES
ECHOES AT TIMES $t_A, t_B, t_C$

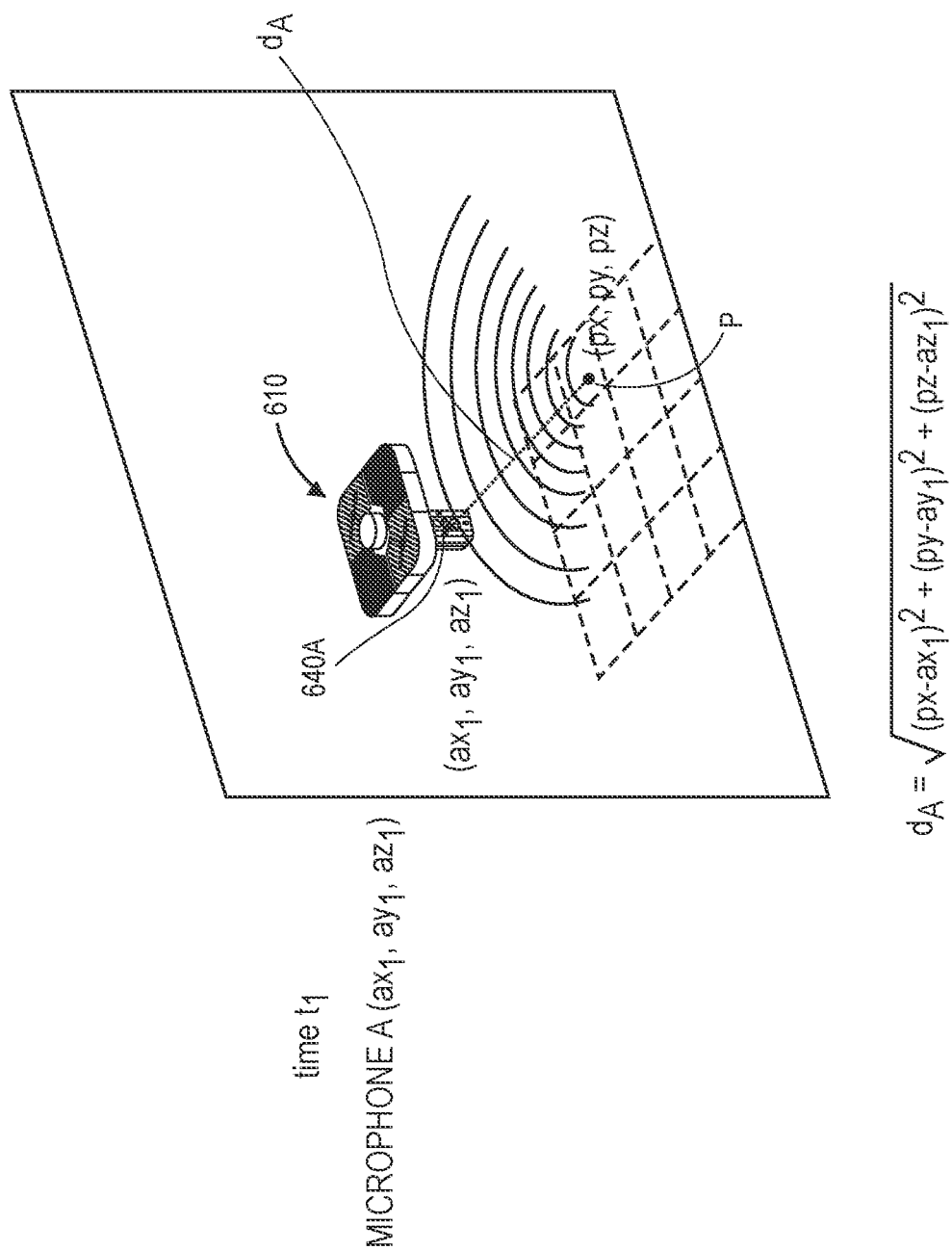

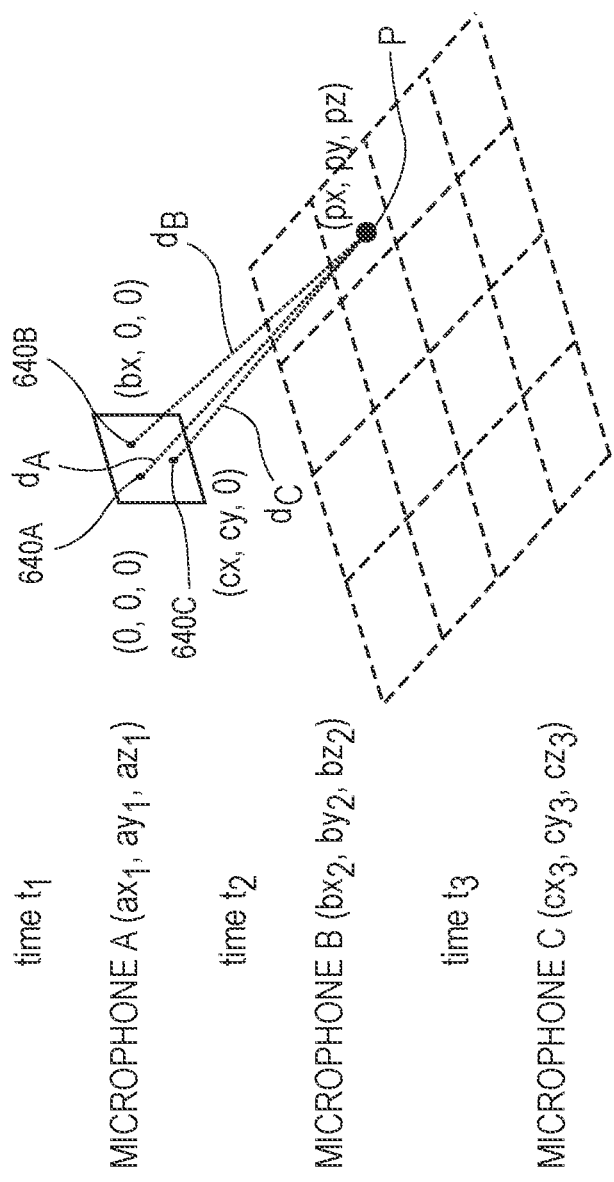
FIG. 6F POSITIONS OF MICROPHONES AND OBJECT WITHIN FIRST COORDINATE SYSTEM

ENCODER GENERATES FEATURE DATA BASED ON ORIGINAL AUDIO DATA

OBSTACLE DETECTION AND LOCALIZATION OF AERIAL VEHICLES USING ACTIVE OR PASSIVE SONAR

BACKGROUND

Aerial vehicles operating in outdoor spaces may determine information regarding their positions in three-dimensional space according to any number of techniques, and based on many types of information or data that may be obtained from any source. For example, an aerial vehicle may determine a position in three-dimensional space using a position sensor, e.g., a Global Positioning System ("GPS") receiver that captures signals from one or more satellites or other sources, as well as an inertial measurement unit (or "IMU"), one or more altimeters, barometers, or other components.

Where aerial vehicles operate in indoor spaces, or in outdoor spaces having narrow dimensions or other physical constraints, determining positions of aerial vehicles, or distances between the aerial vehicles and objects in three-dimensional space using satellites or by other methods is complicated. For example, most GPS receivers may typically determine positions to within approximately two to five meters, a level of accuracy that is suitable in most outdoor applications, but is unreliable indoors, where distances between floors and ceilings are often three meters or less.

Moreover, where an aerial vehicle is equipped with one or more sensors that determine distances or ranges to objects based on captured reflections of emitted light, such as "time-of-flight" sensors, "light detection and ranging" (or "LIDAR") sensors, cameras, or others, such distances or ranges are often inaccurate or unreliable. For example, where a space includes objects that are planar, smooth, or at least partially transparent, such as a pane of glass, a mirror, or another similar feature, determining distances between an aerial vehicle and such objects using traditional light-based sensors is often difficult, as effects of light reflections and light scattering on surfaces of shiny objects are hard to model. Because some spaces lack abundant natural light, and because some objects having planar, smooth or partially transparent surfaces may reflect or scatter light in some locations but enable light to pass therethrough in others, estimations of distances by light-based sensors are often erroneous.

BRIEF DESCRIPTION OF THE DRAWINGS

FIGS. 6A through 6L are views of aspects of one system in accordance with embodiments of the present disclosure.

DETAILED DESCRIPTION

As is set forth in greater detail below, the present disclosure is directed to systems and methods for detecting obstacles and localizing aerial vehicles using sound generated by the aerial vehicles during operation, such as sounds that are actively emitted by one or more speakers provided aboard the aerial vehicles, or naturally generated by or radiated from the aerial vehicles during in-flight operations, and captured following reflections (e.g., echoes) of the sounds from surfaces of objects within spaces in which the aerial vehicles are operating.

In some implementations, aerial vehicles may be outfitted or equipped with one or more speakers or other systems for emitting pulses of acoustic energy, and microphones or other acoustic sensors for capturing the echoes or other reflections of the acoustic energy. The echoes or other reflections may be determined to match or correspond with sounds actively emitted by one or more speakers of the aerial vehicles, or with sounds generated or radiated by the aerial vehicles during operations, and used to calculate ranges to one or more objects based on such reflections.

The systems and methods of the present disclosure may be utilized in any indoor or outdoor environment, and are particularly useful for aerial vehicles operating in indoor spaces or other environments where distances or ranges to obstacles or objects are substantially short, where maneuverability may be limited, where natural light conditions are low, or where surfaces within such environments are unfavorable. The systems and methods of the present disclosure may operate independently, or along with data captured by one or more other sensors, to determine positions of obstacles or other objects, or to determine ranges to such obstacles or objects for localization.

Figure 1A:
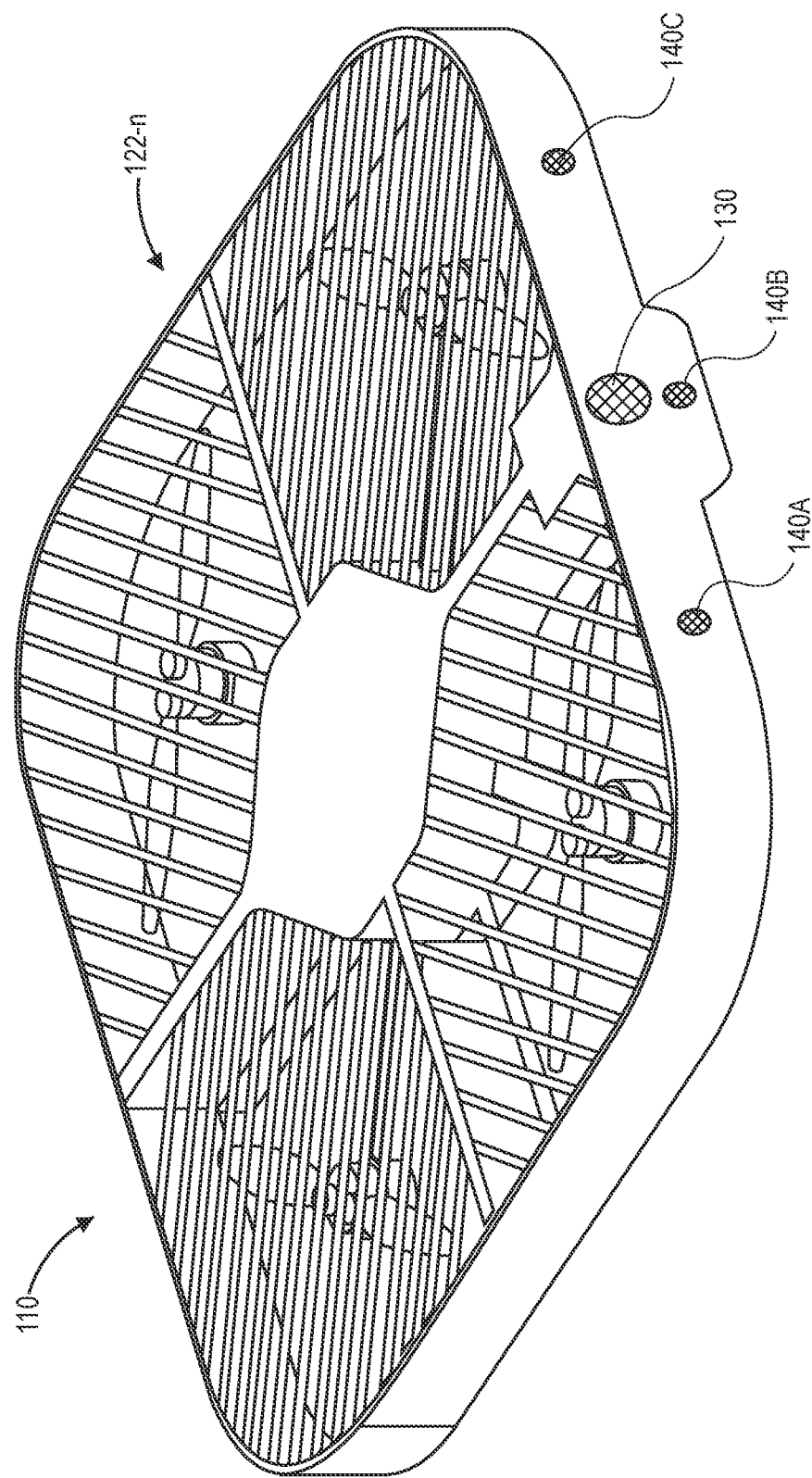
FIGS. 1A through 1G are views of aspects of one system in accordance with embodiments of the present disclosure.

Referring to FIGS. 1A through 1G, views of aspects of one system in accordance with embodiments of the present disclosure are shown. As is shown in FIG. 1A, an aerial vehicle (or drone) 110 is outfitted with a plurality of propulsion motors 122-$n$, as well as a speaker 130 (or another acoustic emitting system) and a plurality of microphones (or other acoustic sensors) 140A, 140B, 140C.

The aerial vehicle 110 may include a frame and a pair of covers. As is shown in FIG. 1A, the frame of the aerial vehicle 110 may be defined by a plurality of sides (e.g., four sides) and may have a common height. For example, as is shown in FIG. 1A, the frame may have a substantially square cross-section, e.g., a cross-section in the shape of a square with rounded corners or edges, or a squircle, with a substantially constant height, or with a height having one or more extensions above or below a balance of the frame.

Additionally, in some implementations, the aerial vehicle 110 may include a fuselage (or a housing or a chamber) having a shape that is also defined by a plurality of sides (e.g., four sides) and a common height. For example, such a fuselage may also have a substantially square cross-section, e.g., a cross-section in the shape of a square with rounded corners or edges, or a squircle, with a constant height. Alternatively, in some embodiments, a frame and a fuselage (or a housing or a chamber) of the aerial vehicle 110 may have cross-sections of any other sizes or shapes, e.g., rectangles other than squares, triangles, or any other polygons, or circles or any other curvilinear shapes.

For example, in some implementations, a height of a fuselage (or a housing or a chamber) of the aerial vehicle 110 may be greater than a height of a frame of the aerial vehicle 110, and a length or width of the frame may be greater than a length or width of the fuselage. Alternatively, in some embodiments, a fuselage (or a housing or a chamber) of the aerial vehicle 110 may have cross-sections of any other sizes or shapes, e.g., rectangles other than squares, triangles, or any other polygons, or circles or any other curvilinear shapes. In some embodiments, a frame and a fuselage (or a housing or a chamber) may have the same or similar shapes, where each of the sides of the frame is parallel to at least one of the sides of the fuselage. In some other embodiments, however, a frame and a fuselage (or a housing or a chamber) may have different or dissimilar shapes, and sides of the frame and sides of the fuselage need not be parallel to one another.

In some implementations, the frame and a fuselage (or a housing or a chamber) may be mounted to one another in a manner that causes a geometric center or centroid of a cross-section of the frame to be aligned along a common axis with a geometric center or centroid of a cross-section of the fuselage.

In some implementations, the aerial vehicle 110 may also include a time-of-flight sensor module or a LIDAR sensor module or a time-of-flight sensor module provided at least partially above or below the frame or a fuselage (or a housing or a chamber).

The propulsion motors 122-*n* may be of any number, e.g., four, and of any type or form of motor (e.g., electric, gasoline-powered or any other type of motor) capable of generating sufficient rotational speeds of one or more propellers or other components to provide thrust and/or lift forces to the aerial vehicle 110. For example, one or more of the motors 122-*n* may be a brushless direct current ("DC") multi-phase motor such as an outrunner brushless motor or an inrunner brushless motor, and may be aligned or configured to operate with different capacities or ratings, or at different speeds, or coupled to any number of propellers having different sizes and shapes. Additionally, one or more of the motors 122-*n* may be an electric motor, e.g., a brushless DC multi-phase motor, and one or more of the motors 122-*n* may be a gasoline-powered motor.

As is further shown in FIG. 1A, the speaker 130 and the microphones 140A, 140B, 140C are provided on one face of the frame. Alternatively, speakers (or other acoustic emitting systems) or microphones (or other acoustic sensors) may be provided in any location on the frame or any fuselage, or in any other location on the aerial vehicle 110, and in any number.

The speaker 130 may be any device or system configured to convert electrical signals into acoustic energy of any intensity and across any or all frequencies. The speaker 130 may be one or more electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters. The speaker 130 may have any dimensions or shapes with respect to the aerial vehicle 110, and may occupy any share or portion of any surface of the aerial vehicle 110.

The microphones 140A, 140B, 140C may be one or more acoustic sensors or other devices, components, systems or instruments for capturing and/or interpreting acoustic energy, including but not limited to one or more microphones (e.g., a transducer such as a dynamic microphone, a condenser microphone, a ribbon microphone or a crystal microphone) that are configured to convert acoustic energy of any intensity and across any or all frequencies into one or more electrical signals. The microphones 140A, 140B, 140C may have any dimensions or shapes with respect to the aerial vehicle 110, and may occupy any share or portion of any surface of the aerial vehicle 110.

The aerial vehicle 110 may further include any number of other sensors or systems, such as control systems (e.g., one or more electronic speed controls, power supplies, navigation systems and/or payload engagement controllers), sensors for determining an orientation or a position of the aerial vehicle 110, such as one or more gyroscopes, one or more accelerometers, one or more compasses (or other magnetometers), or Global Positioning System ("GPS") transceivers. The aerial vehicle 110 may further include any number of computer components, e.g., one or more processors, memory components and/or transceivers (not shown), or any other microcontrollers or components for aiding in the determination of accelerations, velocities, positions and/or orientations. The aerial vehicle 110 may also include any number of range sensors that are configured to transmit light along one or more axes or directions, to capture reflections of the light, or to interpret such reflections in order to generate depth images, range profiles or other sets of distances from the aerial vehicle 110 to one or more objects. The aerial vehicle 110 may also be programmed with data representing one or more environment maps (or internal representations), or other sets of distances to objects, or positions of such objects.

Figure 1B:
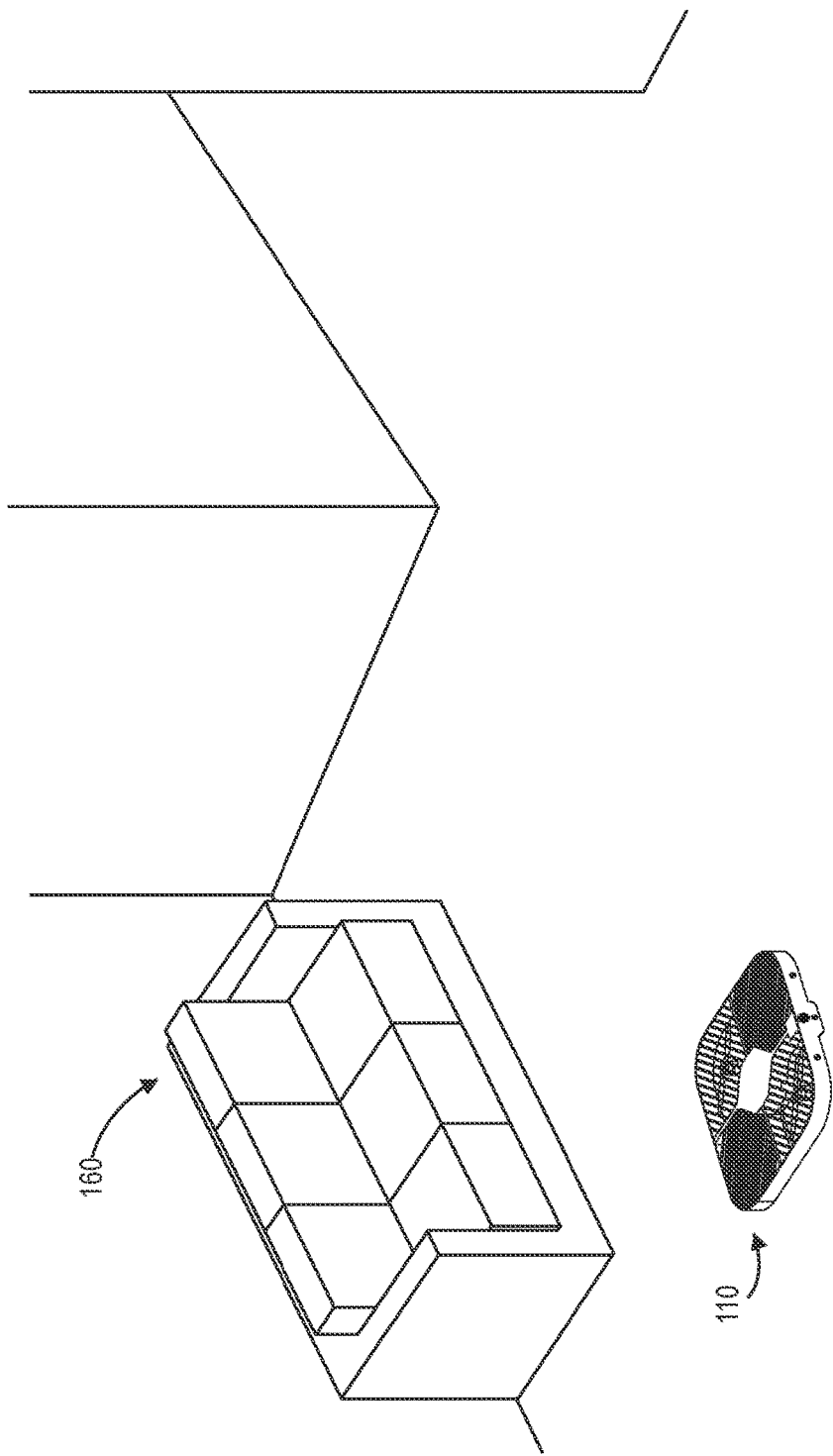
Figure 1C:
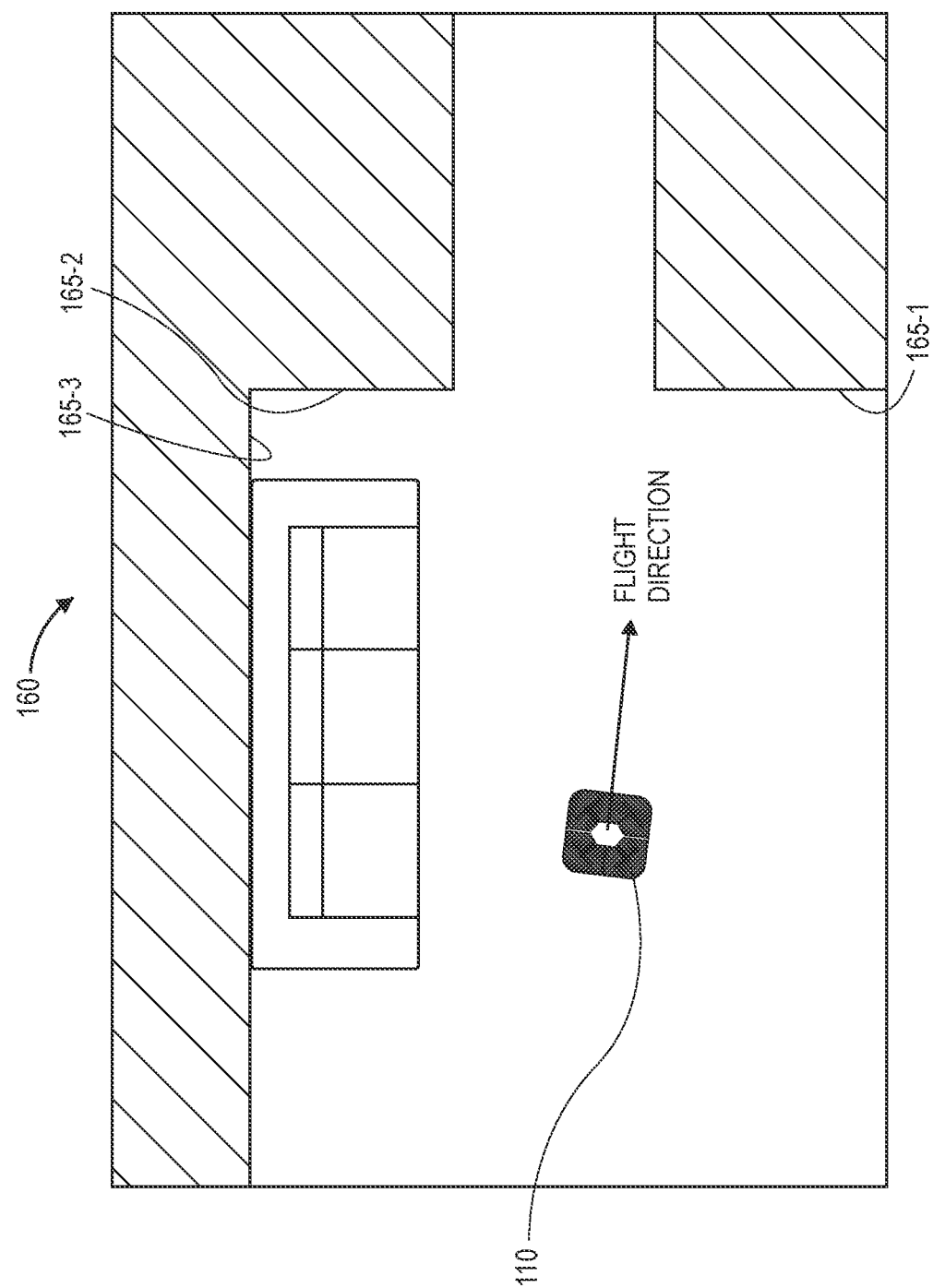

As is shown in FIGS. 1B and 1C, as the aerial vehicle 110 travels within a room 160 or another indoor space, the aerial vehicle 110 may determine a position and an altitude of the aerial vehicle 110, as well as velocities, accelerations or orientations along or about one or more principal axes using an inertial measurement unit or any other onboard sensors.

The room 160 may be any indoor space such as a basement, a bathroom, a bedroom, a cellar, a closet, a corridor, a den, a dining room, a family room, a foyer, a garage, a gymnasium, a hall, a kitchen, a laundry room, a library, a living room, a nursery, an office, a pantry, a parlor, a passageway, a powder room, a reception area, a storage room, a theater, or any other space inside a building or structure of any type, form or kind. Additionally, the room 160 may include or be defined by a number of walls (or other surfaces) 165-1, 165-2, 165-3, which may be aligned at any angle (e.g., vertical, or any non-vertical angle). In some implementations, the walls 165-1, 165-2, 165-3 may be aligned at common angles (e.g., vertical or non-vertical angles) to one another in their entireties, or joined at edges or other aspects or locations. Alternatively, the room 160 may be defined in any other manner and may have any other shape. In some implementations, the aerial vehicle 110 may operate in an outdoor space other than the room 160.

Figure 1D:
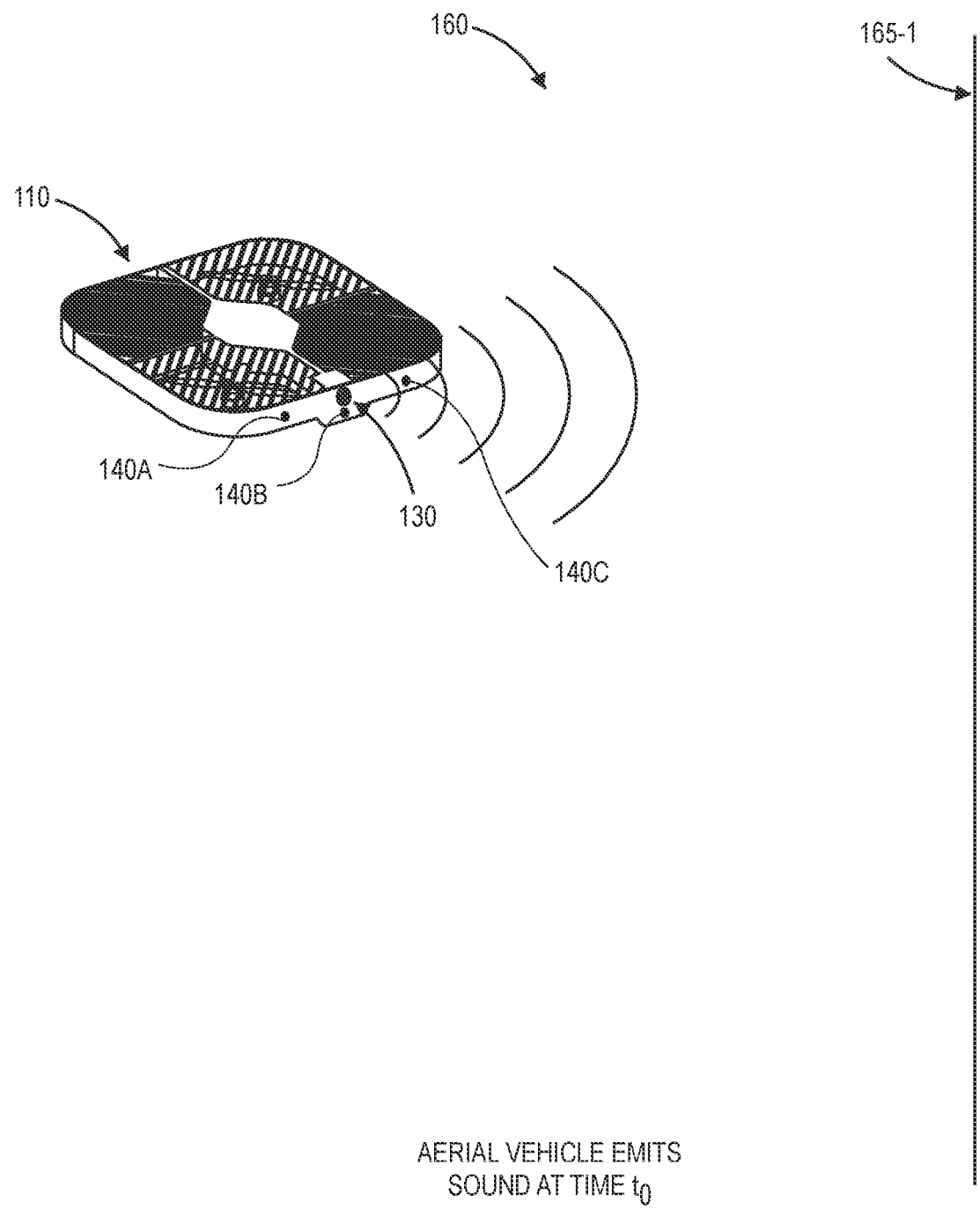

As is shown in FIG. 1D, the aerial vehicle 110 actively emits sound (e.g., acoustic energy) at time $t_0$ while operating within the room 160. For example, in some implementations, the speaker 130 may emit acoustic energy in the form of acoustic continuous-wave (or "CW") pulses, pings or other signals, having frequencies or bandwidths determined by a phase coding or frequency spread of the signals. Alternatively, the sounds or other acoustic energy emitted by the speaker 130 may have any other form.

Figure 1E:
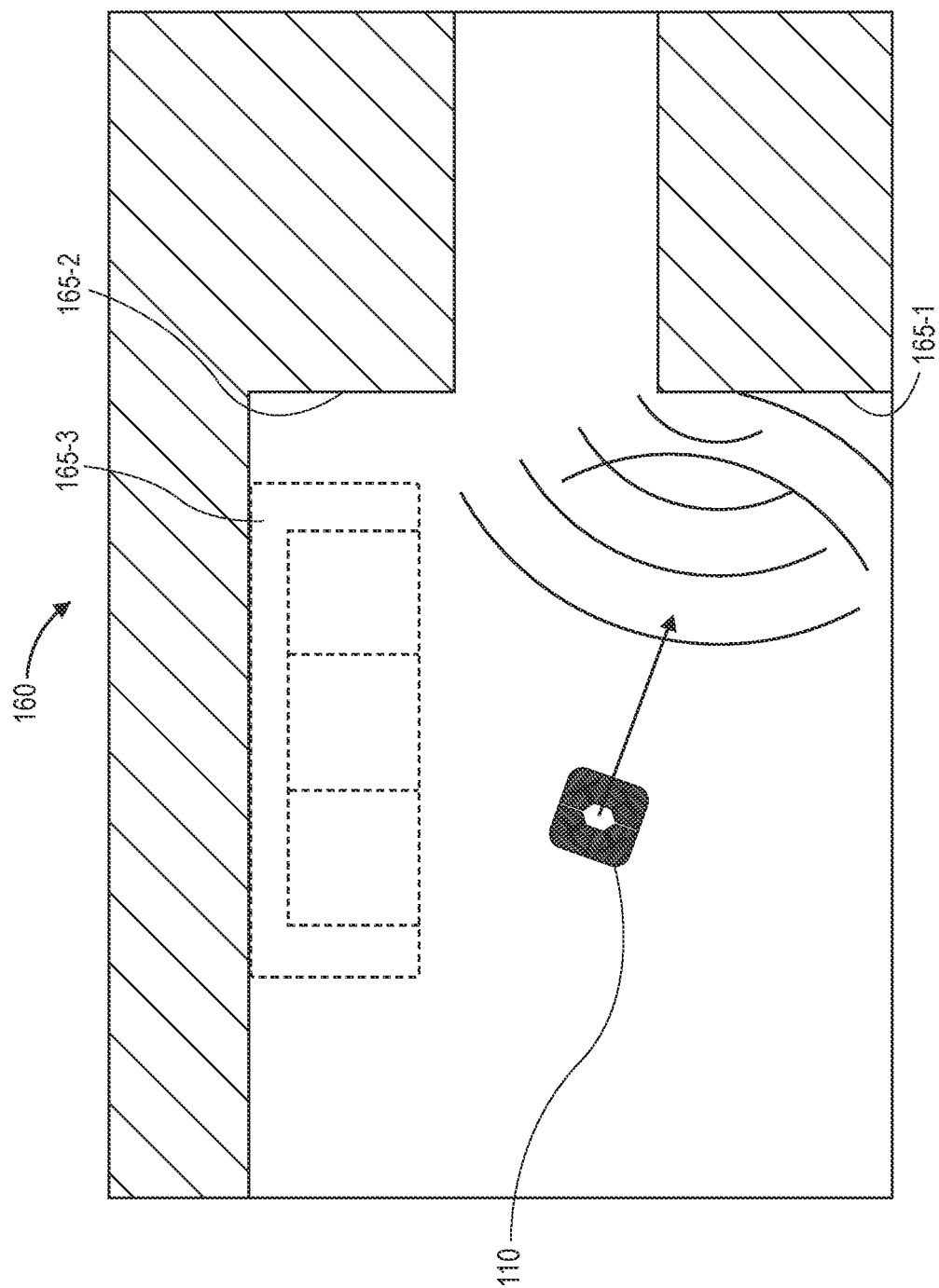

As is shown in FIG. 1E, after the aerial vehicle 110 has emitted the sound or other acoustic energy, the sound or other energy is reflected or scattered by the walls 165-1, 165-2, 165-3 or other surfaces or objects within the room 160. An extent to which the sound or other energy is reflected or scattered by the walls 165-1, 165-2, 165-3 or other surfaces within the room (e.g., ceilings or floors) or other objects within the room (e.g., furniture) may be determined as functions of the textures or other properties of the materials or substances from which such walls were formed. For example, where one or more of the walls 165-1, 165-2, 165-3 is covered by substantially absorptive materials, the intensity of sound reflected by such walls may be diminished. Where one or more of the walls 165-1, 165-2, 165-3 is covered by substantially reflective materials, the intensity of sound reflected by such walls may approximate or be similar to an intensity of the sound emitted by the speaker 130.

Figure 1F:
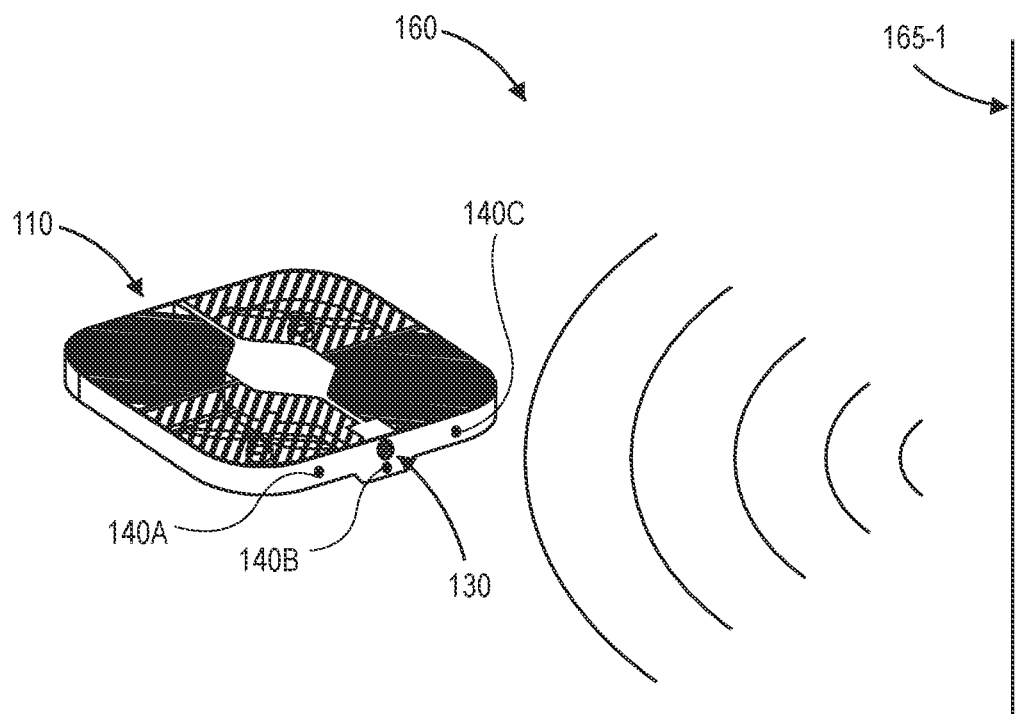

As is shown in FIG. 1F, the microphones 140A, 140B, 140C of the aerial vehicle 110 capture acoustic data including reflections of the sound from the wall 165-1. Because the microphones are provided in different locations on the aerial vehicle 110, the reflections of the sound from the wall 165-1 are captured at different times with respect to one another. Thus, as is shown in FIG. 1F, the microphone 140A captures the reflection of the sound at a time $t_A$, while the microphone 140B captures the reflection of the sound at a time $t_B$, and the microphone 140C captures the reflection of the sound at a time $t_C$.

The reflections may be identified in any manner when aspects of the sounds emitted by the speaker 130 are detected within acoustic data representing energy captured by the respective microphones 140A, 140B, 140C. For example, the aspects of the sounds emitted by the speaker 130 may be identified within such data where similarities or correspondences between one or more intensities, frequencies or other attributes of the captured sound and intensities, frequencies or other attributes of the emitted sounds or intensities. For example, in some implementations, captures of the reflections may be detected when variations of amplitudes of such reflections are consistent with variations of amplitudes of the emitted sound, subject to the effects of spreading, absorption, reflection losses, ambient noises, or others. In some implementations, where the microphones capture sounds over wide swaths of frequencies, individual, discrete bands of the frequencies may be monitored to determine whether amplitudes of energy represented in acoustic data captured at, near or around such frequencies are consistent with one or more frequencies of the emitted sound. In some implementations, where the emitted sound has specific contents (e.g., digits or sequences of digits), captures of the reflections may be detected when such contents are detected within the reflections.

Alternatively, in some implementations, the reflections may be identified when acoustic data representing energy captured by the one or more of the microphones 140A, 140B, 140C is provided to a machine learning algorithm, system or technique that is trained to recognize aspects of sounds emitted by the speaker 130 within such data. For example, in some implementations, a neural network, such as a fully connected neural network, a convolutional network, or another neural network, may act to encode captured audio signals into latent space representations, and subsequently decoded to other representation that approximate the audio signals as if such signals had been captured in open space. Reflections of the sounds are then obtained by eliminating the newly calculated open space audio signal representations and ambient noise from the audio signals captured by the microphones 140A, 140B, 140C.

Figure 1G:
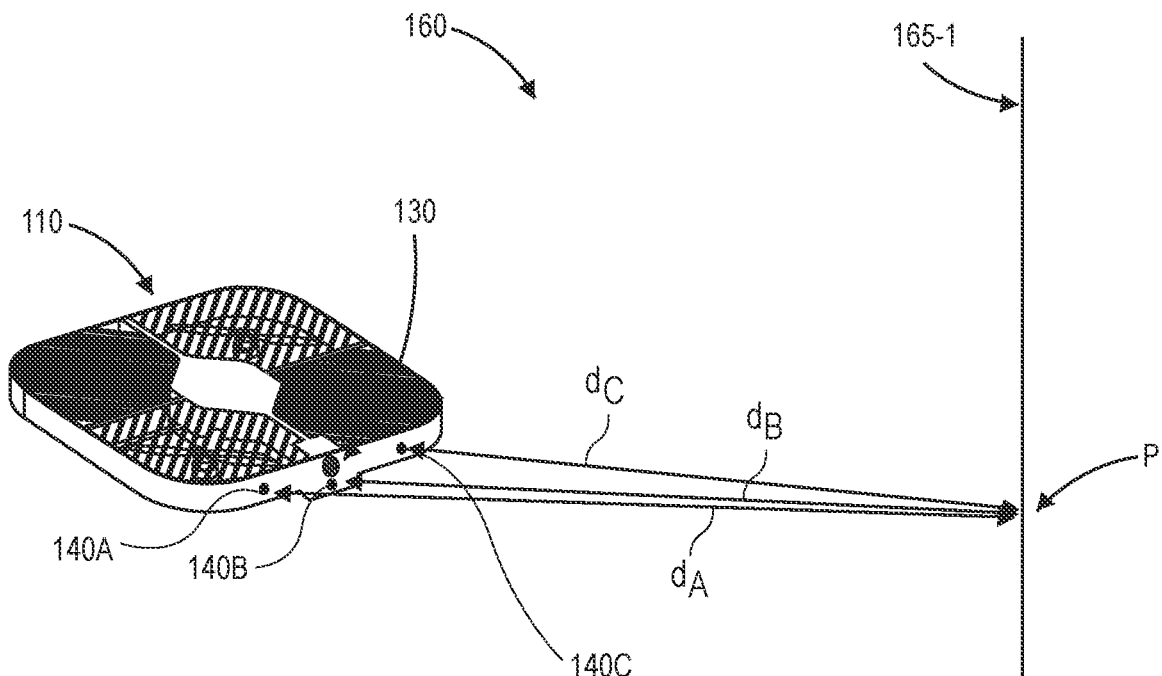

As is shown in FIG. 1G, a position corresponding to at least a portion P of the wall 165-1 may be identified or determined by calculating distances between each of the microphones 140A, 140B, 140C and the portion P of the wall 165-1. The portion P of the wall 165-1 may include a nearest point on the wall 165-1 to the speaker 130, viz., a first point of the wall 165-1 to return a reflection of the sound emitted by the speaker 130 at the time $t_0$.

For example, as is shown in FIG. 1G, a distance (or range) $d_A$ between the microphone 140A and the portion P of the wall 165-1 may be determined by dividing a product of one half of a speed of sound in air, or c, and a difference between the time $t_0$ when the sound was emitted and the time $t_A$ when the sound was captured by the microphone 140A. Similarly, as is also shown in FIG. 1G, a distance $d_B$ between the microphone 140B and the portion P of the wall 165-1 may be determined by dividing a product of one half of a speed of sound in air, or c, and a difference between the time $t_0$ when the sound was emitted and the time $t_B$ when the sound was captured by the microphone 140B, while a distance $d_C$ between the microphone 140C and the portion P of the wall 165-1 may be determined by dividing a product of one half of a speed of sound in air, or c, and a difference between the time $t_0$ when the sound was emitted and the time $t_C$ when the sound was captured by the microphone 140C.

Alternatively, in some implementations, the distances $d_A$, $d_B$, $d_C$ between the respective microphones 140A, 140B, 140C and the portion P of the wall 165-1 may be calculated based on differences between times when the active emission of the sound by the speaker 130 is initially detected by each of the microphones 140A, 140B, 140C, rather than the time $t_0$ at which the sound was emitted by the speaker 130, and times when reflections of the sound from the portion P of the wall 165-1 are detected by each of the microphones 140A, 140B, 140C.

Thus, each of the distances (or ranges) $d_A$, $d_B$, $d_C$ may be independently determined based on the times $t_A$, $t_B$, $t_C$, at which the reflections of the sound from the portion P of the wall 165-1 were separately captured by each of the microphones 140A, 140B, 140C. Where a position of the aerial vehicle 110 is known, e.g., in three-dimensional space, and is identified by one or more sets of coordinates, a position of the portion P of the wall 165-1 may be determined based on the distances (or ranges) $d_A$, $d_B$, $d_C$, such as by trilateration, triangulation or in any other manner. Alternatively, where the aerial vehicle 110 includes only a single acoustic sensor, e.g., just one of the microphones 140A, 140B, 140C, or where acoustic data captured by just one acoustic sensor is processed, a distance determined based on the acoustic data captured by the acoustic sensor may be used to determine that an object is within a range defined by that distance, without determining a bearing to or position of the object.

The calculation of distances (or ranges) $d_A$, $d_B$, $d_C$ shown in FIG. 1G, and the identification of the position of the portion P of the wall 165-1 therefrom, may occur based on any number of emissions of sound by the speaker 130, and may be calculated with respect to any number of points on the wall 165-1. Thus, in some implementations, a plurality of distances or ranges to the wall 165-1 may be constructed from various returns of echoes or other reflections of sound captured by the microphones 140A, 140B, 140C in response to the emission of sound.

Moreover, the systems and methods of the present disclosure may be utilized in conjunction with any number of other systems or methods for detecting obstacles or other objects, or navigating within one or more indoor spaces. For example, where the aerial vehicle 110 is equipped with one or more other sensors, such as imaging devices, time-of-flight sensors, LIDAR sensors, or others, information or data regarding positions of or ranges to obstacles or other objects determined from captured reflections of sounds may be utilized in conjunction with information or data regarding positions of or ranges to obstacles or other objects determined by such other sensors, e.g., according to one or more sensor fusion techniques.

Furthermore, in accordance with implementations of the present disclosure, information or data regarding positions of or ranges to obstacles or other objects determined from captured reflections of sounds may be used to generate or construct an environment map (or internal representation) of an indoor space, such as the room 160, that identifies or depicts one or more boundaries (e.g., walls, ceilings, floors) or other aspects of such spaces, as well as the respective dimensions of such spaces, or the respective surfaces or textures of such boundaries. For example, positions of a plurality of portions of the wall 165-1 or other walls 165-2, 165-3 may be determined based on reflections of acoustic data from such portions, in the manner described above with respect to the position of the portion P, and an environment map of the room 160 may be constructed from such positions.

The systems and methods of the present disclosure are directed to the operation of aerial vehicles (e.g., unmanned aerial vehicles, or drones) in any spaces, such as one or more indoor spaces, and detecting obstacles or other objects based on sound reflected from such objects within such spaces. The aerial vehicles of the present disclosure may be of any type or form, and may include but need not be limited to low-power drones that may be configured for traveling or performing tasks during operations within indoor spaces.

In some implementations, an aerial vehicle may be outfitted or equipped with one or more modules, e.g., hardware components or software applications to be executed by one or more hardware components. Such modules may include an obstacle detection module that may assess relative positions of obstacles in a given environment, using temporal information to fuse data received from range sensors provided aboard the aerial vehicle, e.g., a rotating two-dimensional LIDAR sensor and time-of-flight sensors provided in fixed orientations with respect to a frame, a fuselage or another component of the aerial vehicle. Additionally, a range map, a point cloud or another representation may be subject to pixelization to determine whether any obstacles are present, and to minimize computation resources and processing power.

The aerial vehicles of the present disclosure may be outfitted with one or more processors, components, transceivers, sensors or other systems for engaging in communications with aspects of a facility (e.g., appliances, lighting, environmental or other systems), as well as any persons within the facility. For example, an aerial vehicle may include any number of transceivers for communicating with aspects of the Internet or one or more other networks, including but not limited to any wired or wireless routers within a facility, or any other computer devices therein, as well as any number of sensors or readers for communicating via any wired or wireless systems or protocols, including but not limited to wireless fidelity ("Wi-Fi"), Bluetooth, radio frequency identification (or "RFID"), near-field communication (or "NFC") readers, or any other type of systems or protocols. For example, the aerial vehicles may further include any number of audio or video sensors, including but not limited to one or more imaging devices (e.g., digital cameras) and/or microphones, or any other type of sensors, embedded or incorporated therein.

Additionally, an aerial vehicle may further include any number of sensors, such as imaging devices (e.g., cameras configured to capture visual or depth data), temperature sensors, magnetometers, Wi-Fi receivers, Bluetooth receivers, or others, and may be programmed or configured to travel throughout one or more spaces of a facility and to capture data using such sensors. Based on the captured data, an environment map (or internal representation) of such spaces or the facility may be generated. The environment map may identify or depict one or more boundaries (e.g., walls, ceilings, floors) or other aspects of such spaces, as well as the respective dimensions of such spaces, or the respective surfaces or textures of such boundaries. In some embodiments, an aerial vehicle may autonomously travel throughout one or more spaces of a facility in order to capture data using one or more sensors, and such data may be utilized in generating an environment map of the spaces of the facility. In some other embodiments, an aerial vehicle may be transported (e.g., carried) or escorted by a human actor throughout such spaces, and may capture data using one or more sensors as the aerial vehicle is transported or escorted throughout such spaces. Data captured as the aerial vehicle when escorted may be utilized in generating an environment map of the spaces of the facility. Additionally, in some embodiments, the aerial vehicle may selectively operate one or more propulsion motors as the aerial vehicle is transported or otherwise escorted throughout such spaces, in order to maintain altitude and/or tilt control. Furthermore, in some embodiments, data captured by the aerial vehicle as the aerial vehicle travels throughout the spaces of the facility may be adjusted to account for presence of one or more body parts of a human actor that is transporting or otherwise escorting the aerial vehicle through the facility, as well as amplitudes or frequencies of audio signals that may be present throughout the facility.

In accordance with some embodiments of the present disclosure, an aerial vehicle may be configured to operate along with one or more stations, e.g., base components, charging docks (or charging stations or docking stations), or other intermediary devices. Such stations may have openings, cavities or spaces configured to accommodate one or more portions of an aerial vehicle, and may include one or more surfaces that are aligned to come into contact with corresponding surfaces of the aerial vehicle, thereby enabling electrical power, information or data to be conveyed between the aerial vehicle and such stations. In some embodiments, a base component, a charging dock, or another intermediary device may include an opening, a cavity or another space that is sized and shaped to receive or accommodate a specific portion of an aerial vehicle, e.g., a frame or a fuselage of the aerial vehicle, and to enable the aerial vehicle to be aligned in one of a plurality of alignments or orientations with respect to the base component, the charging dock or intermediary device.

Moreover, aerial vehicles of the present disclosure may be configured for use or operation within facilities of any kind. As used herein, the term "facility" shall refer to any building, region, structure or other space (e.g., covered or uncovered), such as a home of any type, kind, shape or form, including but not limited to a house, an apartment, a condominium, a dormitory, a barracks, or any other defined or undefined structure having one or more living spaces. A facility may also be a business-related structure such as a building, an office, a shopping center, a restaurant, a post office, a grocery store, a department store, a materials handling facility, or any other defined or undefined structure having one or more commercial areas. A facility may also be any other type of facility including but not limited to stadiums, ballfields, transportation centers or financial institutions (e.g., banks). In some embodiments, the facility may be or include an island or a space station.

The transmission of acoustic energy in waves, and the receipt of reflections of the acoustic energy, such as by one or more sonar or acoustic systems, are commonly used in a number of applications. Sonar, which stands for "sound navigation and ranging," is a technology or procedure by which objects are detected, or distances to such objects are determined, by transmitting acoustic energy (e.g., pulses) and capturing data regarding reflections of such energy (e.g., echoes) from the one or more objects. Objects may be detected based on the reflections of such energy. For example, a bearing or angle to an object may be determined by calculating a bearing or angle from which the reflected energy was received. Additionally, a distance to an object may be determined based on a difference in time between when an acoustic signal is transmitted and when a reflection of such energy is received.

Figure 2:
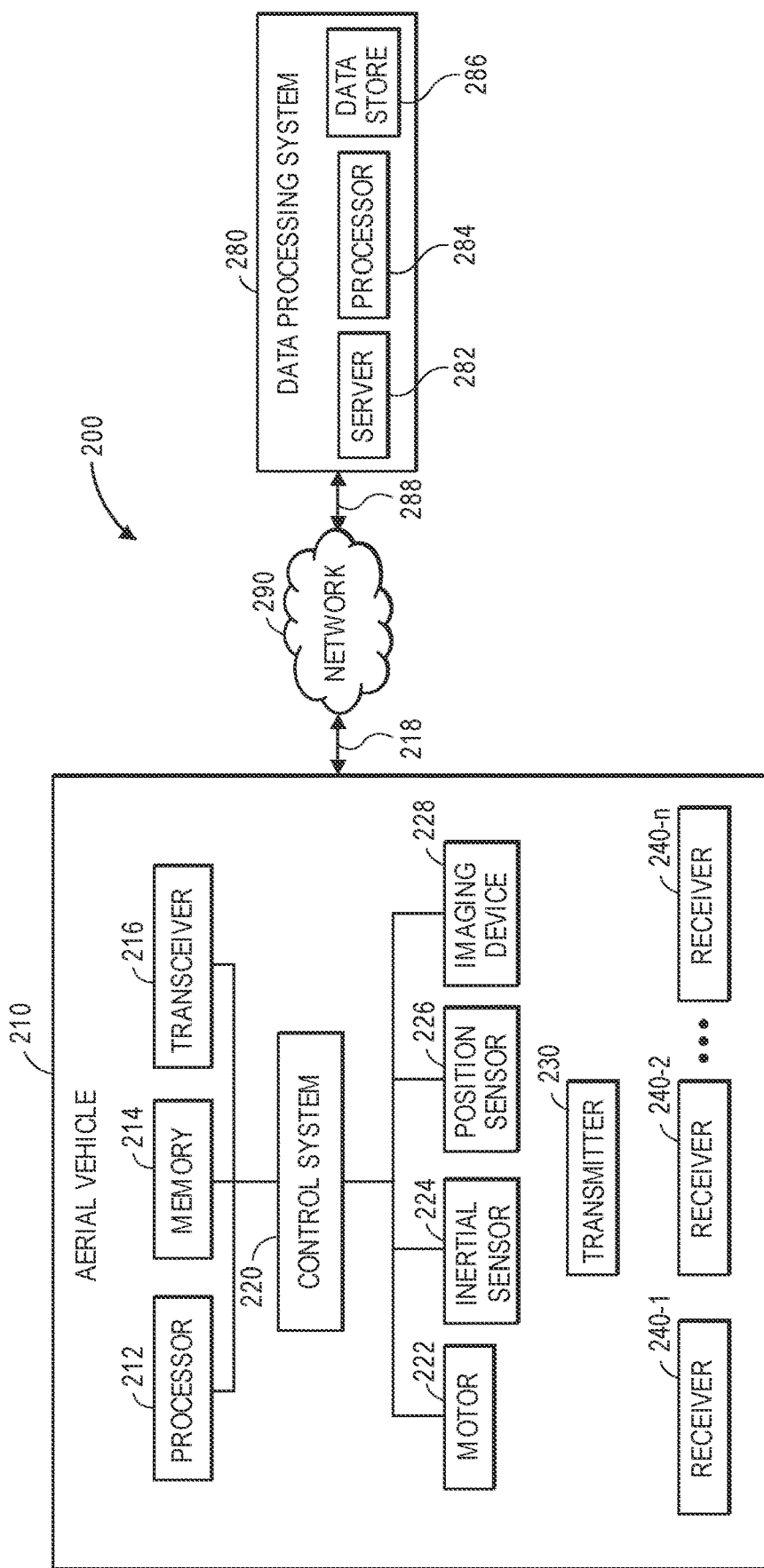
FIG. 2 is a block diagram of one system in accordance with embodiments of the present disclosure.

Referring to FIG. 2, a block diagram of one system in accordance with embodiments of the present disclosure is shown. The system 200 of FIG. 2 includes an aerial vehicle 210 and a data processing system 280 connected to one another over a network 290, which may include the Internet, in whole or in part. Except where otherwise noted, reference numerals preceded by the number "2" shown in FIG. 2 indicate components or features that are similar to components or features having reference numerals preceded by the number "1" shown in FIGS. 1A through 1G.

The aerial vehicle 210 includes a processor 212, a memory 214 and a transceiver 216. The aerial vehicle 210 further includes a control system 220, a plurality of propulsion motors 222, an inertial sensor 224, a position sensor 226 and an imaging device 228. The aerial vehicle 210 also includes a transmitter 230 and a plurality of receivers (or receiving elements) 240-1, 240-2 . . . 240-*n* that are mounted or coupled to surfaces of the aerial vehicle 210, such as is shown in FIG. 1A.

The processor 212 may be configured to perform any type or form of computing function associated with the operation of the aerial vehicle 210, including but not limited to the execution of one or more algorithms or techniques, such as by calculating delay times for transmitting one or more signals by the transmitter 230, or by determining bearings or angles from which reflected energy originated based on one or more signals captured by the receivers 240-1, 240-2 . . . 240-*n*. The processor 212 may also be configured to execute any other algorithms or techniques (e.g., object detection or recognition algorithms or techniques) associated with one or more applications, purposes or functions, or to select at least one of a course, a speed or an altitude for the safe operation of the aerial vehicle 210. For example, the processor 212 may be configured to control any aspects of the operation of the aerial vehicle 210 and the one or more computer-based components thereon, including but not limited to the propulsion motors 222, the inertial sensor 224, the position sensor 226 and/or the imaging device 228.

The processor 212 may also control the operation of one or more control systems or modules, such as the control system 220, for generating instructions for conducting operations of one or more of the propulsion motors 222, the inertial sensor 224, the position sensor 226 and/or the imaging device 228, or for interpreting information or data captured by one or more onboard sensors, e.g., the inertial sensor 224, the position sensor 226 and/or the imaging device 228, or others (not shown). Such control systems or modules may be associated with one or more other computing devices or machines, and may communicate with the data processing system 280 or one or more other computer devices or aerial vehicles (not shown) over the network 290, through the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a central processing unit ("CPU"), graphics processing unit ("GPU") or a neural processing unit ("NPU") having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. For example, the memory 214 may be configured to store information or data regarding energy transmitted by the transceiver 230, information or data regarding energy captured by the receiver 240-1, 240-2 . . . 240-*n*, or any other information or data. The memory 214 may be configured to store executable instructions, imaging data, flight paths, flight control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), nonvolatile/Flash-type memory, or any other type of memory. In some embodiments, program instructions, imaging data, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems (e.g., other aerial vehicles, not shown) via the network 290. For example, in some embodiments, the transceiver 216 may be configured to coordinate I/O traffic between the processor 212 and one or more onboard or external computer devices or components, e.g., the propulsion motors 222, the altimeter 224, the position sensor 226 and/or the imaging device 228. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

The control system 220 may include one or more electronic speed controls, power supplies, navigation systems and/or payload engagement controllers for controlling aspects of the operation of the aerial vehicle 210, as desired. For example, the control system 220 may be configured to cause or control the operation of one or more of the propulsion motors 222, the altimeter 224, the position sensor 226 and/or the imaging device 228, such as to cause one or more of the propulsion motors 222 to rotate propellers at desired speeds, to capture information or data regarding altitudes, positions and/or speeds, and to cause one or more of the imaging devices 228 to capture any imaging data (e.g., still or moving images) as well as any associated audio data and/or metadata. The control system 220 may also operate the one or more propulsion motors 222 to cause such propellers to be aligned in selected positions or angles. The control system 220 may further control any other aspects of the aerial vehicle 210, including but not limited to the operation of one or more control surfaces (not shown) such as wings, rudders, ailerons, elevators, flaps, brakes, slats or other features within desired ranges, or the enactment with or release of one or more items by one or more engagement systems (not shown). In some embodiments, the control system 220 may be integrated with one or more of the processor 212, the memory 214 and/or the transceiver 216, and configured to receive commands or generate and provide status updates of propeller speeds, as well as times and lengths of any adjustments.

The propulsion motors 222 may be any type or form of motor (e.g., electric, gasoline-powered or any other type of motor) capable of generating sufficient rotational speeds of one or more propellers or other components to provide lift and/or thrust forces to the aerial vehicle 210 and any payload engaged thereby, to aerially transport the engaged payload thereby. In some embodiments, one or more of the propulsion motors 222 may be a brushless DC multi-phase motor such as an outrunner brushless motor or an inrunner brushless motor.

The aerial vehicle 210 may include any number of such propulsion motors 222 of any kind. For example, one or more of the propulsion motors 222 may be aligned or configured to provide forces of lift to the aerial vehicle 210, exclusively, while one or more of the propulsion motors 222 may be aligned or configured to provide forces of thrust to the aerial vehicle 210, exclusively. Alternatively, one or more of the propulsion motors 222 may be aligned or configured to provide forces of lift and forces of thrust to the aerial vehicle 210, as needed. For example, the propulsion motors 222 may be fixed in their orientation on the aerial vehicle 210, or configured to vary their respective orientations, e.g., a tilt-rotor aircraft. Moreover, the propulsion motors 222 may be aligned or configured to operate with different capacities or ratings, or at different speeds, or coupled to propellers having different sizes and shapes. Additionally, one or more of the propulsion motors 222 may be an electric motor, e.g., a brushless DC multi-phase motor, and one or more of the propulsion motors 222 may be a gasoline-powered motor.

Each of the propulsion motors 222 may be coupled to one or more propellers (or rotors or rotatable systems) having a plurality of shaped blades joined to a hub or boss. For example, each of such propellers may be rotatably mounted to a mast or shaft associated with a respective one of the propulsion motors 222 and may be configured to generate forces of thrust when rotated within a fluid. Each of such propellers may include any number of blades, and may be fixed pitch, adjustable pitch or variable pitch in nature. Moreover, one or more of such propellers may be banded or shielded in any manner. In some embodiments, one or more propellers may be configured to rotate about a vertical axis, and to provide forces of lift in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of lift and/or thrust in directions corresponding to such axes accordingly.

The inertial sensor 224 may include one or more components for measuring linear and/or angular motion of the aerial vehicle 210. The inertial sensor 224 may include one or more gyroscopes (e.g., mechanical or electrical components or instruments for determining an orientation), one or more accelerometers (e.g., mechanical or electrical components or instruments for sensing or measuring accelerations), one or more compasses or other magnetometers (e.g., mechanical or electrical components or instruments for determining one or more directions with respect to a frame of reference that is fixed with respect to the surface of the Earth), or other components.

The position sensor 226 may be any device, component, system or instrument adapted to receive signals (e.g., trilateration data or information) relating to a position of the aerial vehicle 210, from one or more GPS satellites of a GPS network, from one or more towers or beacons from a cellular telephone network, or from any other source (not shown). In some embodiments, the position sensor 226, or position data received thereby, may be used to determine an airspeed of the aerial vehicle 210 over time. In some other embodiments, the aerial vehicle 210 may include one or more devices, components, systems, or instruments for determining a speed or velocity of the aerial vehicle 210, and may include related components (not shown) such as pitot tubes, accelerometers, or other features.

The imaging device 228 may be any form of optical recording devices that may be aligned with respect to any expected or ordinary operating orientation of the aerial vehicle 210, and are configured to photograph or otherwise record imaging data of objects or any other elements within fields of view forward of, aft of, lateral to, above or below the aerial vehicle 210, or for any other purpose. The imaging device 228 may include one or more processors, one or more memory or storage components, and one or more image sensors, e.g., color sensors, grayscale sensors, black-and-white sensors, depth sensors, or the like, and may further include one or more photosensitive surfaces, filters, chips, electrodes, clocks, boards, timers, power sources, connectors or any other relevant features (not shown). The imaging device 228 may capture imaging data in the form of one or more still or moving images of any kind or form, as well as any relevant audio signals or other information during the operation of the aerial vehicle 210.

The imaging device 228 may be mounted, fixed, embedded or otherwise joined to one or more external surfaces of the aerial vehicle 210 in any manner and in any orientation or alignment to capture imaging data from above the aerial vehicle 210. For example, the imaging device 228 may be coupled to any form of support system or structure for maintaining the lenses or other optical elements of the imaging device 228 at a selected orientation or configuration. Alternatively, the imaging device 228 may be mounted, fixed, embedded or otherwise joined to external surfaces of the aerial vehicle 210 in any other manner.

The imaging device 228 may communicate with the processor 212 and/or the control system 220, or with one another, by way of a wired or wireless connection that may be dedicated or comprise all or part of an internal network (not shown), e.g., an internal communications bus. Additionally, the imaging device 228 may be adapted or otherwise configured to communicate with the data processing system 280 by way of the network 290. The imaging device 228 may be of any type or form in accordance with the present disclosure, including but not limited to one or more digital cameras, depth sensors or range cameras, infrared cameras, radiographic cameras or other optical sensors.

In addition to the imaging device 228, the aerial vehicle 210 may also include any number of other sensors, components or other features for controlling or aiding in the operation of the aerial vehicle 210, including but not limited to one or more environmental or operational sensors for determining one or more attributes of an environment in which the aerial vehicle 210 is operating, or may be expected to operate, including extrinsic information or data or intrinsic information or data. For example, the aerial vehicle 210 may include one or more compasses, speedometers, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude indicators, depth gauges, accelerometers, or sound sensors (e.g., microphones, piezoelectric sensors, vibration sensors or other transducers for detecting and recording acoustic energy from one or more directions).

Although the block diagram of the system 200 shown in FIG. 2 includes a single box for a propulsion motor 222, a single box for an altimeter 224, a single box for a position sensor 226 and a single box for an imaging device 228, those of ordinary skill in the pertinent arts will recognize that any number or type of propulsion motors, altimeters, position sensors and/or imaging devices may be provided aboard the aerial vehicle 210 in accordance with the present disclosure.

The transmitter 230 may be any devices or systems for transmitting energy that is provided in association with the aerial vehicle 210. In some embodiments, the transmitter 230 may be configured to emit acoustic signals in a single direction, or in multiple directions. For example, in some embodiments, the transmitter 230 may be configured to transmit continuous-wave (or "CW") pulses, e.g., pings, which may take the form of phase-coded transmit signals having bandwidths determined by the phase coding or frequency spread of the signals. Alternatively, in some other embodiments, the transmitter 230 may be configured to emit electromagnetic signals in one or more waves or pulses. Each of the transmitter 230 may be configured to transmit signals at any power level, frequency (e.g., center frequency), wavelength or bandwidth, and within any total frequency range.

The receivers (or receiving elements) 240-1, 240-2 . . . 240-$n$ may be any device or system for receiving energy (e.g., acoustic energy or, alternatively, electromagnetic energy), or capturing information or data relating to received energy, that are configured to be mounted to a surface, e.g., one or more surfaces of the aerial vehicle 210. The receivers 240-1, 240-2 . . . 240-$n$ may be configured to receive energy at any power level, frequency (e.g., center frequency), wavelength or bandwidth, and within any total frequency range.

In some embodiments, the transmitter 230 may also be a receiver, e.g., a transceiver. In some embodiments, one or more of the receivers 240-1, 240-2 . . . 240-$n$ may also be a transmitter, e.g., a transceiver. Additionally, in some embodiments, any of the transmitter 230 or the receivers 240-1, 240-2 . . . 240-$n$ may be configured to transmit or receive signals or energy of any type or form, or of multiple types or forms.

Although the block diagram of the system 200 shown in FIG. 2 includes one box corresponding to the transmitter 230 and three boxes corresponding to the receivers 240-1, 240-2 . . . 240-$n$, those of ordinary skill in the pertinent arts will recognize that any number or type of transmitters and receivers may be mounted in common lines that are perpendicular to one another in accordance with the present disclosure. For example, in some embodiments, the receivers 240-1, 240-2 . . . 240-$n$ may be a single unit configured to receive energy, or to capture information or data relating to received energy. In some other embodiments, the receivers 240-1, 240-2 . . . 240-$n$ may include one or more discrete units that are configured to receive energy, or to capture information or data relating to received energy. For example, the receivers 240-1, 240-2 . . . 240-$n$ may be a synthetic aperture array receiver including a plurality of such units arranged in an array in the shape of a square or another shape. Moreover, the transmitter 230 and the receivers 240-1, 240-2 . . . 240-$n$ may be mounted to any structure, such as any type of vehicle or other system, and are not limited for use in connection with the operation of aerial vehicles in accordance with the present disclosure.

The data processing system 280 includes one or more physical computer servers 282 having one or more computer processors 284 and any number of data stores 286 (e.g., databases) associated therewith, as well as provided for any specific or general purpose. For example, the data processing system 280 of FIG. 2 may be independently provided for the exclusive purpose of receiving, analyzing or storing information or data relating to signals transmitted by the aerial vehicle 210, along with times and relative distances to objects or estimated positions of the aerial vehicle 210 at which energy including reflections of such signals was received, or imaging data captured using the imaging device 228, or, alternatively, provided in connection with one or more physical or virtual services that are configured to receive, analyze or store such information or data, or other information or data, as well as one or more other functions. The servers 282 may be connected to or otherwise communicate with the processors 284 and the data stores 286, which may store any type of information or data, including but not limited to information or data regarding maps, cartographic representations, or statuses of propellers or sensors, for any purpose.

The servers 282 and/or the computer processors 284 may also connect to or otherwise communicate with the network 290, as indicated by line 288, through the sending and receiving of digital data. For example, the data processing system 280 may include any facilities, stations or locations having the ability or capacity to receive and store information or data in one or more data stores, e.g., from the aerial vehicle 210, from one or more other aerial vehicles, or from one or more other external computer systems (not shown) via the network 290. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more aerial vehicles, including but not limited to the aerial vehicle 210.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

In some embodiments, the processor 212, the servers 282 and/or the processors 284 may be configured to generate two-dimensional or three-dimensional maps or other representations of locations of objects, as determined based on angles at which signals are transmitted by the transmitter 230, or bearings or angles to objects from which energy including reflections of the signals are captured by the receivers 240-1, 240-2 . . . 240-n. In some embodiments, the processor 212, the servers 282 and/or the processors 284 may be configured to determine an optimal path or route between two locations for the execution of a given task by the aerial vehicle 210 or one or more other aerial vehicles (not shown). The processor 212, the servers 282 and/or the processors 284 may determine an optimal path or route based on any factor or element, including but not limited to times required to travel on any paths of an optimal route, any costs associated with traveling on the paths, or any other intrinsic or extrinsic factors, such as according to one or more traditional shortest path or shortest route algorithms.

The aerial vehicle 210 and/or the data processing system 280 may use any applications, features, or techniques to connect to the network 290, or to communicate with one another. For example, the aerial vehicle 210 may be adapted to transmit information or data in the form of synchronous or asynchronous messages to the data processing system 280 or to any other computer device (e.g., to one or more other aerial vehicles) in real time or in near-real time, or in one or more offline processes, via the network 290. Those of ordinary skill in the pertinent art would recognize that the aerial vehicle 210 or the data processing system 280 may operate or be operated by any of a number of computing devices that are capable of communicating over the network, including but not limited to set-top boxes, mobile devices, laptop computers, desktop computers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the processor 212, the servers 282 and/or the processors 284, or any other computers or control systems utilized by the aerial vehicle 210 or the data processing system 280 (e.g., by one or more other aerial vehicles), and having sequences of instructions which, when executed by a processor (e.g., a CPU, a GPU or an NPU), cause the processor to perform all or a portion of the functions, services and/or methods described herein. Such computer-executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Any of the functions, calculations, determinations or other processing steps described herein may be performed locally, e.g., by one or more computer processors provided aboard an aerial vehicle, or remotely, e.g., by one or more computer systems in communication with an aerial vehicle. For example, in some implementations, one or more processors provided aboard an aerial vehicle, e.g., the processors 212, may interpret acoustic data captured by one or more microphones provided aboard the aerial vehicle, and calculate distances, bearings or ranges to objects based on the acoustic data. In some other implementations, one or more processors provided in association with an external computer system in communication with an aerial vehicle, e.g., the servers 282, may interpret distances, bearings or ranges to objects and construct an environment map (or internal representation) of a space or area in which the aerial vehicle operated based on such distances, bearings or ranges. Alternatively, any of such functions, calculations, determinations or other processing steps may be performed aboard the aerial vehicle or by one or more back-end systems.

Figure 3:
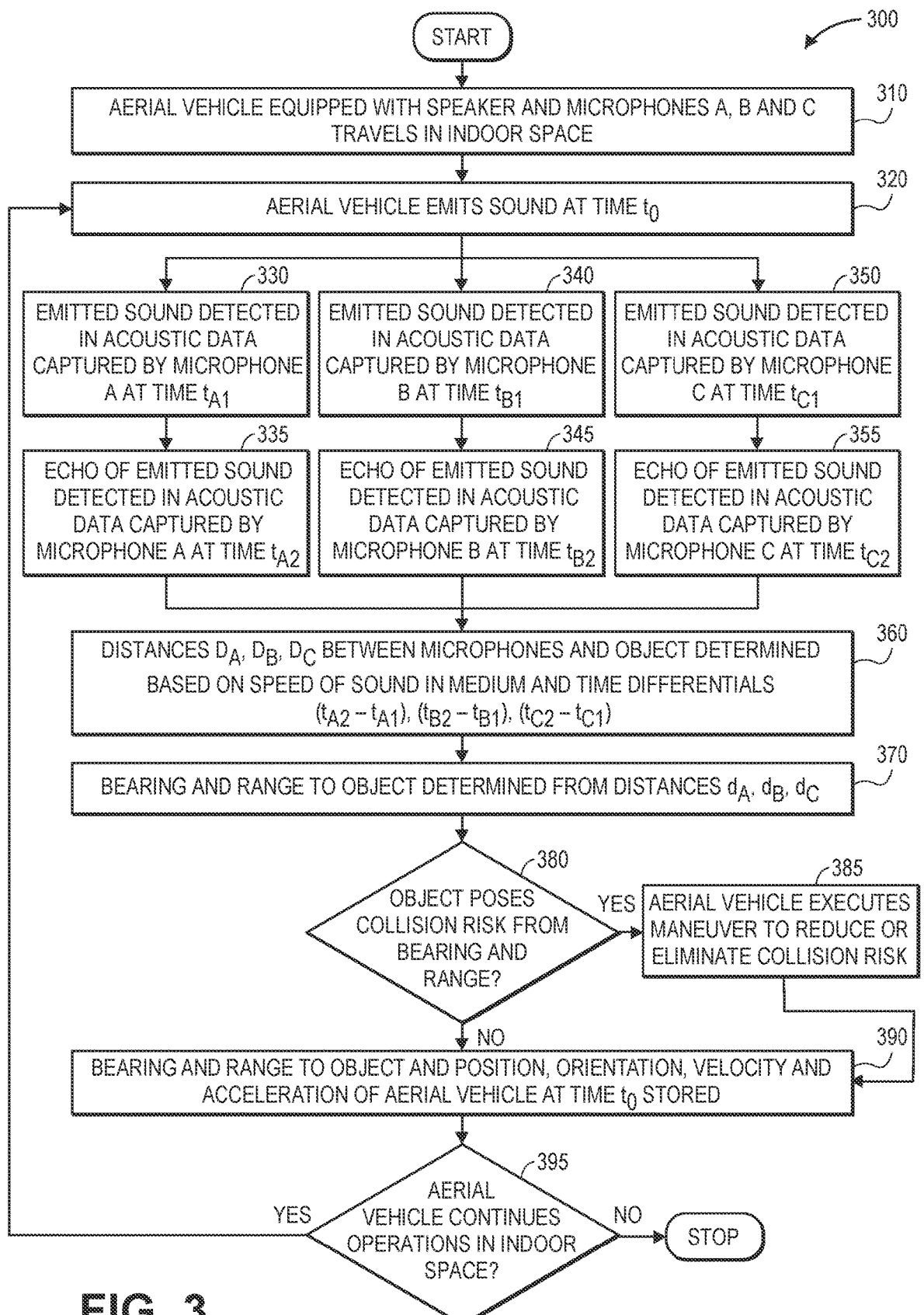
FIG. 3 is a flow chart of one process in accordance with embodiments of the present disclosure.

Referring to FIG. 3, a flow chart 300 of one process in accordance with embodiments of the present disclosure is shown. At box 310, an aerial vehicle equipped with a speaker and a plurality of microphones, viz, a Microphone A, a Microphone B and a Microphone C, travels within an indoor space. The aerial vehicle may travel along a path or a trajectory having any number of waypoints, or in any other manner.

The microphones may be provided in any location or orientation with respect to a frame, a fuselage or other aspects of the aerial vehicle, and configured to capture acoustic data from above, below, or alongside the aerial vehicle. Additionally, the speaker may also be located or oriented in any manner with respect to a frame, a fuselage or other aspects of the aerial vehicle, and configured to project sounds in any direction with respect to the frame, the fuselage or the other aspects of the aerial vehicle.

In addition to the microphones, the aerial vehicle may be outfitted with any number of motors, propellers (or rotors), control surfaces or any other components, such as one or more range sensors (or other imaging devices), any of which may be a time-of-flight sensor, a LIDAR sensor, an imaging device, or any other type or form of sensors. The indoor space may include one or more rooms such as a basement, a bathroom, a bedroom, a cellar, a closet, a corridor, a den, a dining room, a family room, a foyer, a garage, a gymnasium, a hall, a kitchen, a laundry room, a library, a living room, a nursery, an office, a pantry, a parlor, a passageway, a powder room, a reception area, a storage room, a theater, or any other space inside a building or structure of any type, form or kind. The indoor space may be bounded by walls, a ceiling or another upper boundary, as well as a floor or another lower boundary. The ceiling or the floor may be aligned horizontally or at any other angle with respect to one another. Alternatively, the aerial vehicle may operate outdoors or in any location or area other than an indoor space.

At box 320, the aerial vehicle emits a sound at a time to, which may be of any frequency or intensity. In some implementations, the sound may be broadband sound or noise, having a spectral density plot that is substantially flat, or covers a wide range of frequencies. In some other implementations, the sound may be narrowband sound or noise that is typically centered on or around one or more discrete frequencies of a spectral density plot. Additionally, the sound may have an intensity level that is selected on any basis, such as based on an intensity of sound generated by or radiating from one or more propulsion motors or any other systems of the aerial vehicle.

At box 330, the Microphone A captures acoustic data at a time $t_{A1}$, and at box 335, a reflection (e.g., an echo) of emitted sound is detected in acoustic data captured by the Microphone A at a time $t_{A2}$. The acoustic data may represent audio signals determined from sound waves, or mechanical wave energy, at varying intensities, pressures or frequencies. The acoustic data may be captured in any manner, such as by the vibrations of diaphragms, plates or other components, which are converted to electrical currents or signals representing the sound waves.

In some implementations, acoustic data captured by the Microphone A may have any frequency or bandwidth, and may be processed to determine that the sounds emitted by the speaker at box 320 were captured thereby. For example, frequencies, intensities or other attributes of the acoustic data may be compared to background noise within a vicinity of the aerial vehicle, and frequencies, intensities or other attributes of the sounds emitted at box 320.

Similarly, in parallel, at box 340, the Microphone B captures acoustic data at a time $t_{B1}$, and at box 345, an echo of emitted sound is detected in acoustic data captured by the Microphone B at a time $t_{B2}$. Also in parallel, at box 350, the Microphone C captures acoustic data at a time $t_{C1}$, and at box 355, an echo of emitted sound is detected in acoustic data captured by the Microphone C at a time $t_{C2}$.

At box 360, distances between the Microphones A, B, C and an object are determined based on a speed of sound in the medium, e.g., approximately three hundred forty-three meters per second (343 m/s) within dry air, and time differentials $(t_{A2}-t_{A1})$, $(t_{B2}-t_{B1})$, $(t_{C2}-t_{C1})$ between the times $t_{A1}$, $t_{B1}$, $t_{C1}$ at which the emitted sound was detected in acoustic data captured by the microphones at boxes 330, 340, 350 and the times $t_{A2}$, $t_{B2}$, $t_{C2}$ at which reflections of the emitted sound were detected in acoustic data captured by the microphones at boxes 335, 345, 355. For example, a distance $d_A$ between the Microphone A and the object may be calculated as one half of a product of the difference in time $(t_{A2}-t_{A1})$ and the speed of sound c, while a distance $d_B$ between the Microphone B and the object may also be calculated as one half of a product of the difference in time $(t_{B2}-t_{B1})$ and the speed of sound c, while a distance $d_C$ between the Microphone C and the object may also be calculated as one half of a product of the difference in time $(t_{C2}-t_{C1})$ and the speed of sound c.

At box 370, a bearing and a range to the object is determined from the distances $d_A$, $d_B$, $d_C$. For example, where the position of the aerial vehicle is known, the bearing to the object and the range to the object may be determined by trilateration, by triangulation, or by any other technique based on the distances $d_A$, $d_B$, $d_C$. Alternatively, a bearing and a range to the object may be determined from the distances $d_A$, $d_B$, $d_C$ in any other manner.

At box 380, whether the object poses a collision risk to the aerial vehicle based on the bearing and/or the range is determined. The collision risk may be defined in any manner with respect to a course, a speed or an altitude of the aerial vehicle, or any other factors affecting a risk of collision within the indoor space (e.g., a number of humans or other aerial vehicles within the indoor space), or on any other basis.

If the object poses a collision of risk to the aerial vehicle, then the process advances to box 385, where the aerial vehicle executes one or more maneuvers to reduce or eliminate the collision risk. For example, where the object is within a threshold distance or range of the aerial vehicle, and is forward of or along a path or a trajectory of the aerial vehicle, the aerial vehicle may perform one or more braking maneuvers, such as by adjusting a path or a trajectory (e.g., by an insertion of one or more waypoints), or by automatically slowing or reversing course.

If the object does not pose a collision risk, or after the aerial vehicle has executed one or more maneuvers to reduce or eliminate the risk, the process advances to box 390, where a bearing and a range to the object and a position, an orientation, a velocity and an acceleration of the aerial vehicle at the time $t_0$ are stored in one or more data stores. The position, the orientation, the velocity and the acceleration may be determined by any number of onboard sensors, and stored in association with the bearing and the range to the object, or bearings and ranges of any number of objects so determined, on data stores or other memory components provided aboard the aerial vehicle or in one or more external systems.

At box 395, whether the aerial vehicle is to continue operations is determined. If continued operations of the aerial vehicle is determined. if the aerial vehicle is to continue operations, then the process returns to box 320, where the aerial vehicle emits another sound at a time $t_0$, which may be of any frequency or intensity. If continued operations of the aerial vehicle are no longer desired, however, then the process ends.

Figure 4A:
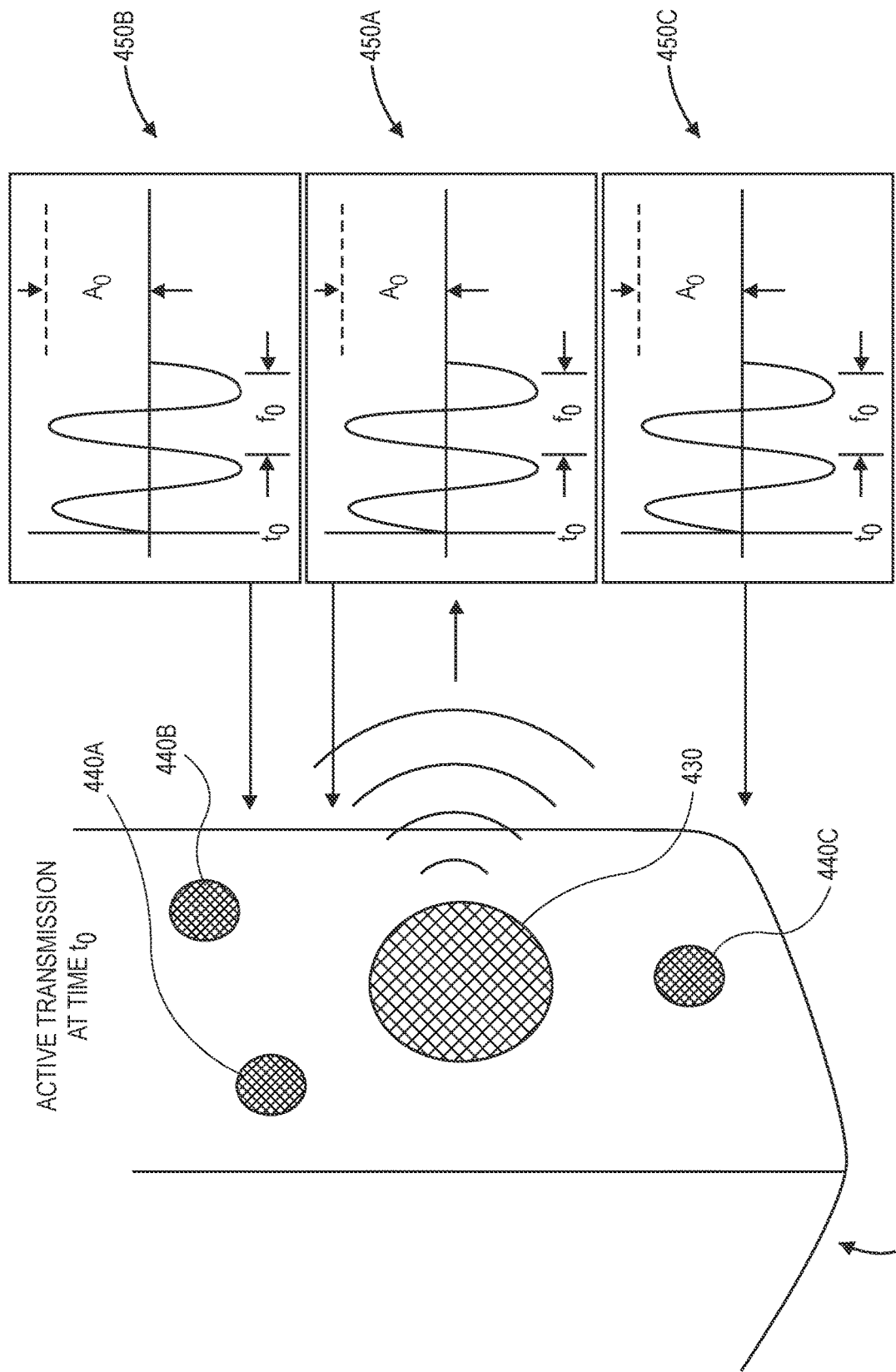
FIGS. 4A through 4C are views of aspects of one system in accordance with embodiments of the present disclosure.
Figure 4B:
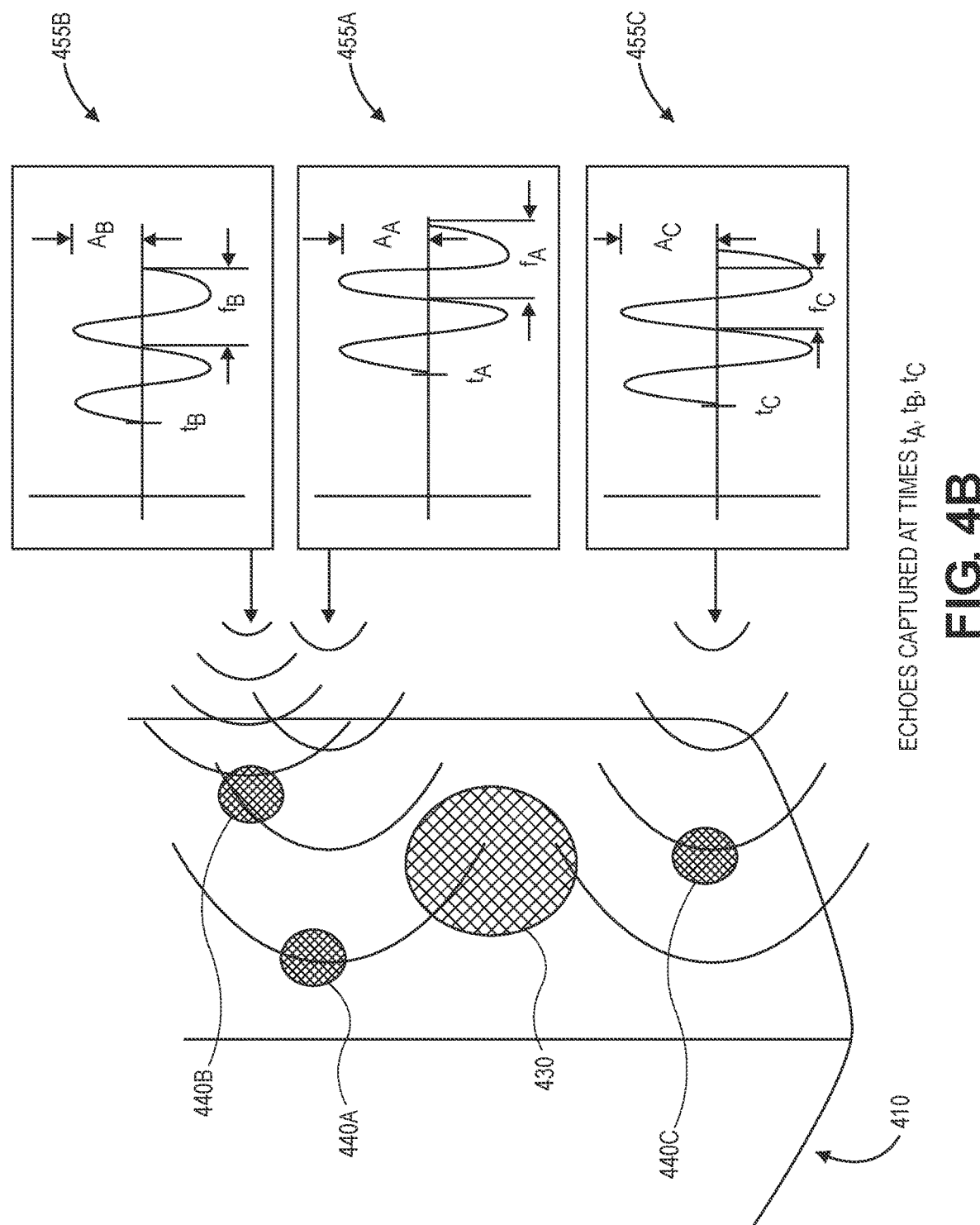
Figure 4C:
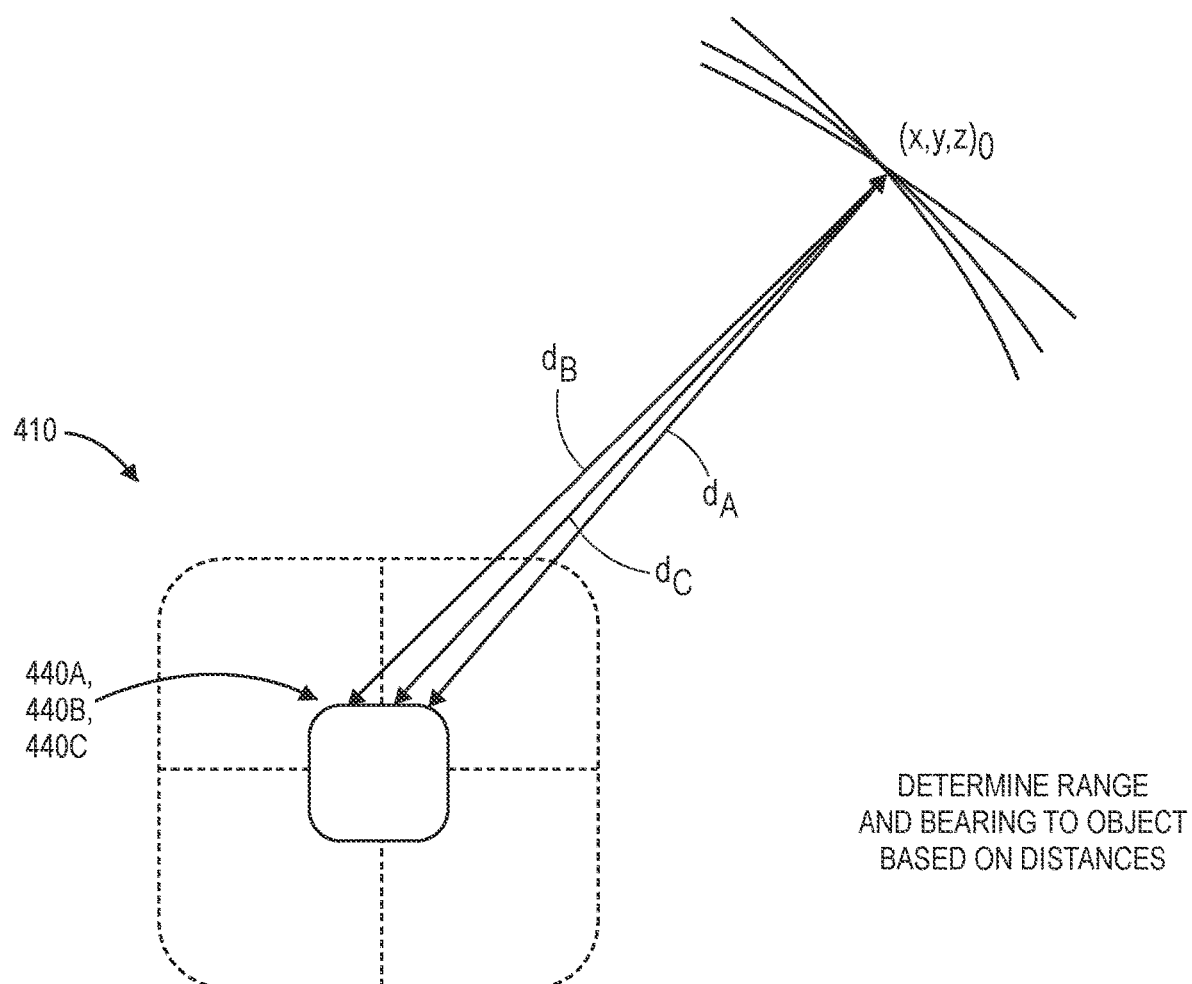

Referring to FIGS. 4A through 4C, views of aspects of one system in accordance with embodiments of the present disclosure are shown. Except where otherwise noted, reference numerals preceded by the number "4" shown in FIGS. 4A through 4C refer to elements that are similar to elements having reference numerals preceded by the number "2" shown in FIG. 2 or by the number "1" shown in FIGS. 1A through 1G.

As is shown in FIG. 4A, a fuselage or another portion of an aerial vehicle 410 includes an audio transmitter 430 (e.g., a speaker) and a plurality of acoustic sensors 440A, 440B, 440C (e.g., microphones) provided on one face of the fuselage. Alternatively, the aerial vehicle 410 may include any number of other transmitters 430 or sensors 440A, 440B, 440C provided on the same face of the fuselage, on other faces of the fuselage, or in other locations of the aerial vehicle 410 (not shown).

As is further shown in FIG. 4A, the transmitter 430 is configured to actively transmit sounds 450 or other acoustic signals at a time $t_0$. The sounds 450 may be transmitted at any frequency or intensity, such as an amplitude $A_0$ and a frequency $f_0$, over any duration of time. Acoustic data 450A, 450B, 450C representing the sounds 450 is captured by each of the acoustic sensors 440A, 440B, 440C.

As is shown in FIG. 4B, when the sounds 450 reflect off one or more objects, the acoustic sensors 440A, 440B, 440C each capture acoustic data 455A, 455B, 455C representing the reflected sounds 455 (e.g., echoes) at different times, where the acoustic sensors 440A, 440B, 440C are located at different positions with respect to the surfaces from which the sounds were reflected. The acoustic data 455A, 455B, 455C may have various acoustic properties, e.g., frequencies, intensities or others, based on properties of the surfaces from which the sounds 450 were reflected or any other bases. For example, as is shown in FIG. 4B, the acoustic sensor 440A captures acoustic data 455A representing an amplitude $A_A$ of the reflected sounds captured by the acoustic sensor 440A and a frequency $f_A$ of the reflected sounds, while the acoustic sensor 440B captures acoustic data 455B representing an amplitude $A_B$ of the reflected sounds captured by the acoustic sensor 440B and a frequency $f_B$ of the reflected sounds, and the acoustic sensor 440C captures acoustic data 455C representing an amplitude $A_C$ of the reflected sounds captured by the acoustic sensor 440C and a frequency $f_C$ of the reflected sounds.

The acoustic data 455A, 455B, 455C may be determined to correspond with reflections of the sounds 450 emitted at time $t_0$ in any manner. For example, where one or more of the frequencies $f_A$, $f_B$, $f_C$ of the acoustic data 455A, 455B, 455C are matched to the frequency $f_0$ of the sounds 450, the acoustic data 455A, 455B, 455C may be determined to correspond to reflections of the sounds 450. Alternatively, where one or more of the amplitudes $A_A$, $A_B$, $A_C$ of the acoustic data 455A, 455B, 455C are consistent with the amplitude $A_0$ of the sounds 450, subject to spreading, absorption, reflection losses, ambient noises, or otherwise, the acoustic data 455A, 455B, 455C may be determined to correspond to reflections of the sounds 450.

Alternatively, the acoustic data 455A, 455B, 455C may be determined to correspond with (or not correspond with) reflections of the sounds 450 emitted at time $t_0$ in any other manner. For example, in some implementations, the acoustic data 455A, 455B, 455C may be processed to exclude impacts to effects of ambient noise levels therefrom.

In some implementations, the acoustic data 455A, 455B, 455C may be further processed to reconstruct an audio signal using one or more machine learning algorithms, systems or techniques, e.g., an artificial neural network, and the audio signal may be compared to the sounds 450 transmitted by the transmitter 430 at time $t_0$, to determine whether the acoustic data 455A, 455B, 455C represents reflections of the sounds 450, or sounds originating from any other source.

As is shown in FIG. 4C, distances $d_A$, $d_B$, $d_C$ calculated based on the emissions of the sounds 450 and the reflections 455 of the sounds by each of the acoustic sensors 440A, 440B, 440C may be used to determine a position $(x, y, z)_0$ of an object from which the reflections 455 were received. For example, spheres, circles, or arcs having centers at locations of each of the acoustic sensors 440A, 440B, 440C and radii equal to the distances $d_A$, $d_B$, $d_C$ may be defined, and the position $(x, y, z)_0$ of the object from which the reflections 455 were received may be determined, in a relative manner, based on an intersection of the spheres, circles or arcs. Where a position of the aerial vehicle 410 is known, an actual position of the object may be determined based on the position of the aerial vehicle 410 and the distances $d_A$, $d_B$, $d_C$ or the relative position $(x, y, z)_0$ of the object. Alternatively, a bearing or a range to the object may be determined in any other manner in accordance with implementations of the present disclosure.

Figure 5:
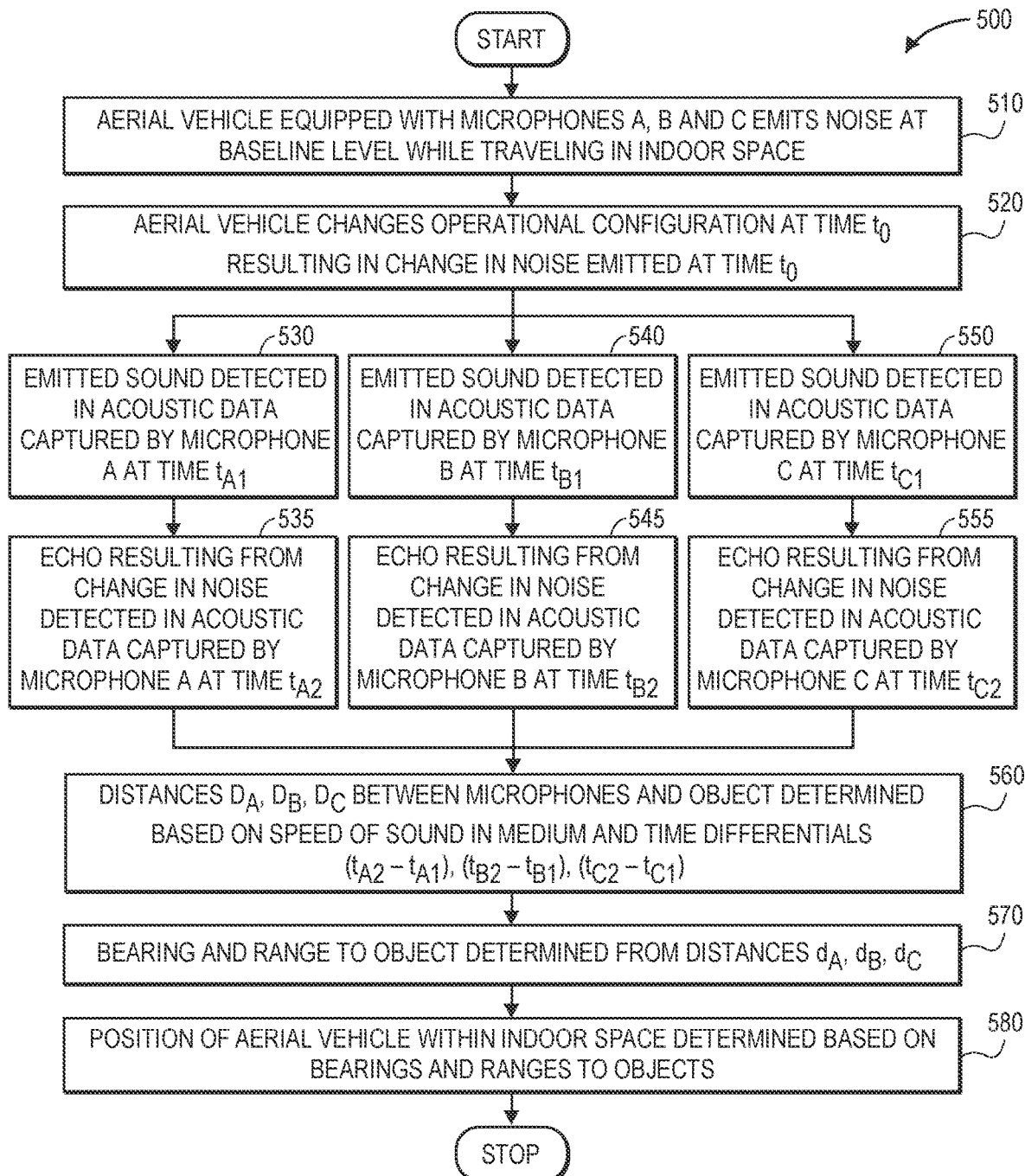
FIG. 5 is a flow chart of one process in accordance with embodiments of the present disclosure.

Referring to FIG. 5, a flow chart of one process in accordance with embodiments of the present disclosure is shown. At box 510, an aerial vehicle equipped with a speaker and a plurality of microphones, viz, a Microphone A, a Microphone B and a Microphone C, travels within an indoor space. The aerial vehicle may travel along a path or a trajectory having any number of waypoints, or in any other manner. Moreover, due to operations of any number of components provided aboard the aerial vehicle, e.g., propulsion motors, propellers, or any other mechanical, electrical or other systems that generate noise, the aerial vehicle may generate noise at a baseline level, e.g., a constant or fixed level, and such noise may include broadband noise, narrowband noise, or noise or sounds of any other type or form.

At box 520, the aerial vehicle changes an operational configuration at a time $t_0$, resulting in a change in the noise emitted by the aerial vehicle at the time $t_0$. The change in the operational configuration may include any change in an operation of any components provided on the aerial vehicle that results in a change in sounds radiating therefrom during operation.

For example, where the aerial vehicle includes multiple propulsion motors, the aerial vehicle may cause a change in an operating speed of one or more of the propulsion motors, e.g., increasing or decreasing a speed of a propulsion motor, or stopping or starting the propulsion motor, which may result in a change in a rotating speed of one or more propellers, as well as a change in a level of noise radiated by the aerial vehicle from the propellers or motors. Alternatively, the aerial vehicle may change its operational configuration in any other manner.

In some implementations, a control system of the aerial vehicle may be programmed or configured to briefly vary operating speeds of one or more of the propulsion motors at regular intervals in order to cause a temporary change in one or more Eulerian angles of the aerial vehicle (e.g., a yaw angle a pitch angle or a roll angle) during flight, and to cause an orientation of the aerial vehicle to return to desired values of the Eulerian angles via adjustments to the operating speeds of the propulsion motors.

At box 530, the Microphone A captures acoustic data at a time $t_{A1}$, and at box 535, a reflection of emitted sound is detected in acoustic data captured by the Microphone A at a time $t_{A2}$. The acoustic data may represent audio signals determined from sound waves, or mechanical wave energy, at varying intensities, pressures or frequencies, and may have been captured in any manner. Similarly, in parallel, at box 540, the Microphone B captures acoustic data at a time $t_{B1}$, and at box 545, an echo of emitted sound is detected in acoustic data captured by the Microphone B at a time $t_{B2}$. Also in parallel, at box 550, the Microphone C captures acoustic data at a time $t_{C1}$, and at box 555, an echo of emitted sound is detected in acoustic data captured by the Microphone C at a time $t_{C2}$.

At box 560, distances $d_A$, $d_B$, $d_C$ between the Microphones A, B, C and an object are determined based on a speed of sound in the medium, and time differentials $(t_{A2}-t_{A1})$, $(t_{B2}-t_{B1})$, $(t_{C2}-t_{C1})$ between the times $t_{A1}$, $t_{B1}$, $t_{C1}$ at which the emitted sound was detected in acoustic data captured by the microphones at boxes 530, 540, 550 and the times $t_{A2}$, $t_{B2}$, $t_{C2}$ at which reflections of the emitted sound were detected in acoustic data captured by the microphones at boxes 535, 545, 555. For example, a distance $d_A$ between the Microphone A and the object may be calculated as one half of a product of the difference in time $(t_{A2}-t_{A1})$ and the speed of sound c, while a distance $d_B$ between the Microphone B and the object may also be calculated as one half of a product of the difference in time $(t_{B2}-t_{B1})$ and the speed of sound c, while a distance $d_C$ between the Microphone C and the object may also be calculated as one half of a product of the difference in time $(t_{C2}-t_{C1})$ and the speed of sound c.

At box 570, a bearing and a range to the object is determined from the distances $d_A$, $d_B$, $d_C$. The bearing and the range to the object determined from the distances $d_A$, $d_B$, $d_C$ may be utilized for any purpose, such as obstacle detection, collision avoidance, navigation, localization, generating environment maps (or internal representations), or for any other purpose.

At box 580, a position of the aerial vehicle is determined based on the bearings and the ranges to the objects determined at box 570. In some implementations, inputs including the bearings and ranges, along with any other information or data, may be provided to an algorithm, a system or a technique for processing, and outputs received from the algorithm, the system or the technique may be compared to an environment map (or an internal representation) that includes known positions of objects within the indoor space. In some implementations, the bearings, the ranges or the other information or data may be processed by a Kalman filter, or Kalman filtering technique, e.g., a state-estimation technique that is commonly used in signal processing, such as in determining a position of a vehicle based on one or more signals. A Kalman filter may facilitate the extraction of useful information from noisy data, and act as a valuable tool for use in navigation systems, particularly those provided aboard aerial vehicles (e.g., UAVs), which may rely on commercial off-the-shelf technology. A Kalman filter may predict a future state of a system based on one or more previous states of the system, to a level or interval of confidence that is subject to an understanding that near predictions are more reliable than distant predictions, and that reliability of data influences reliability of predictions. Alternatively, a position of the aerial vehicle may be determined based on any other information or data, such as the distances themselves, as well as statuses of sensors or motors provided aboard the aerial vehicle, and in any manner.

In some implementations, where distances or ranges to two or more objects are determined based on acoustic signals captured thereby and processed according to an algorithm, system or technique such as a Kalman filter, relative distances or ranges between such objects may be determined. Such relative distances or ranges may be compared to distances between objects determined from an environment map (or internal representation) of a space (e.g., an indoor space), in which the aerial vehicle operates, e.g., by a Kalman filter. The relative distances or ranges may be compared to distances or ranges between the objects on the environment map and where the relative distances or ranges between objects determined based on the acoustic signals match or otherwise correspond to one or more distances between objects on the environment map to a sufficiently high degree of confidence or probability, the position of the aerial vehicle may be determined accordingly.

Bearings and/or ranges to objects may be determined based on reflections of sound from such objects in any manner in accordance with implementations of the present disclosure. Referring to FIGS. 6A through 6L, views of aspects of one system in accordance with embodiments of the present disclosure are shown. Except where otherwise noted, reference numerals preceded by the number "6" shown in FIGS. 6A through 6L refer to elements that are similar to elements having reference numerals preceded by the number "4" shown in FIGS. 4A through 4C, by the number "2" shown in FIG. 2 or by the number "1" shown in FIGS. 1A through 1G.

Figure 6A:
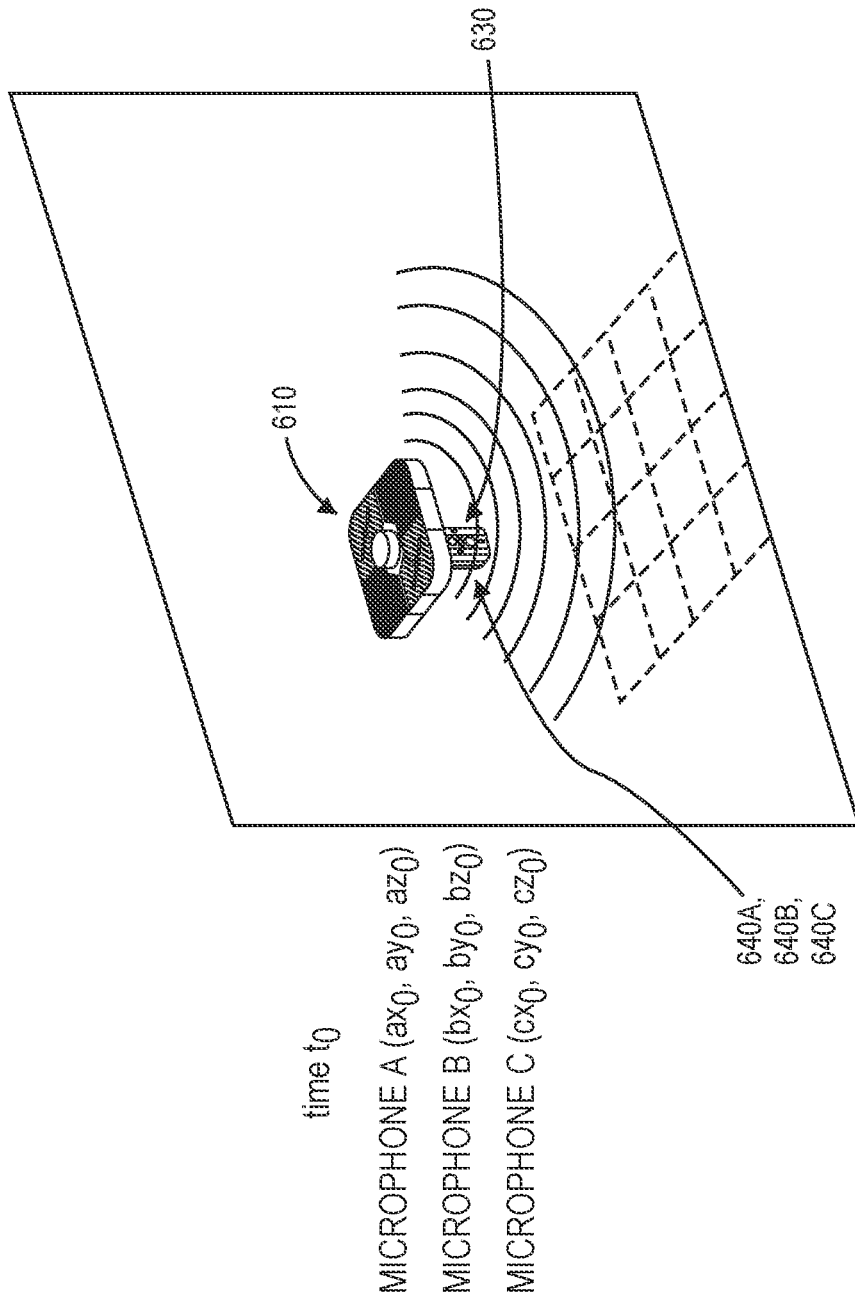

As is shown in FIG. 6A, an aerial vehicle 610 having a speaker 630 and a plurality of microphones 640A, 640B, 640C emits a sound at a time $t_0$. The sound may be any type or form of acoustic energy, such as one or more acoustic continuous-wave (or "CW") pulses, pings or other signals, having frequencies or bandwidths determined by a phase coding or frequency spread of the signals. As is shown in FIG. 6A, at the time $t_0$, the microphone 640A is at a position $(ax_0, ay_0, az_0)$, while the microphone 640B is at a position $(bx_0, by_0, bz_0)$ and the microphone 640C is at a position $(cx_0, cy_0, cz_0)$.

Figure 6B:
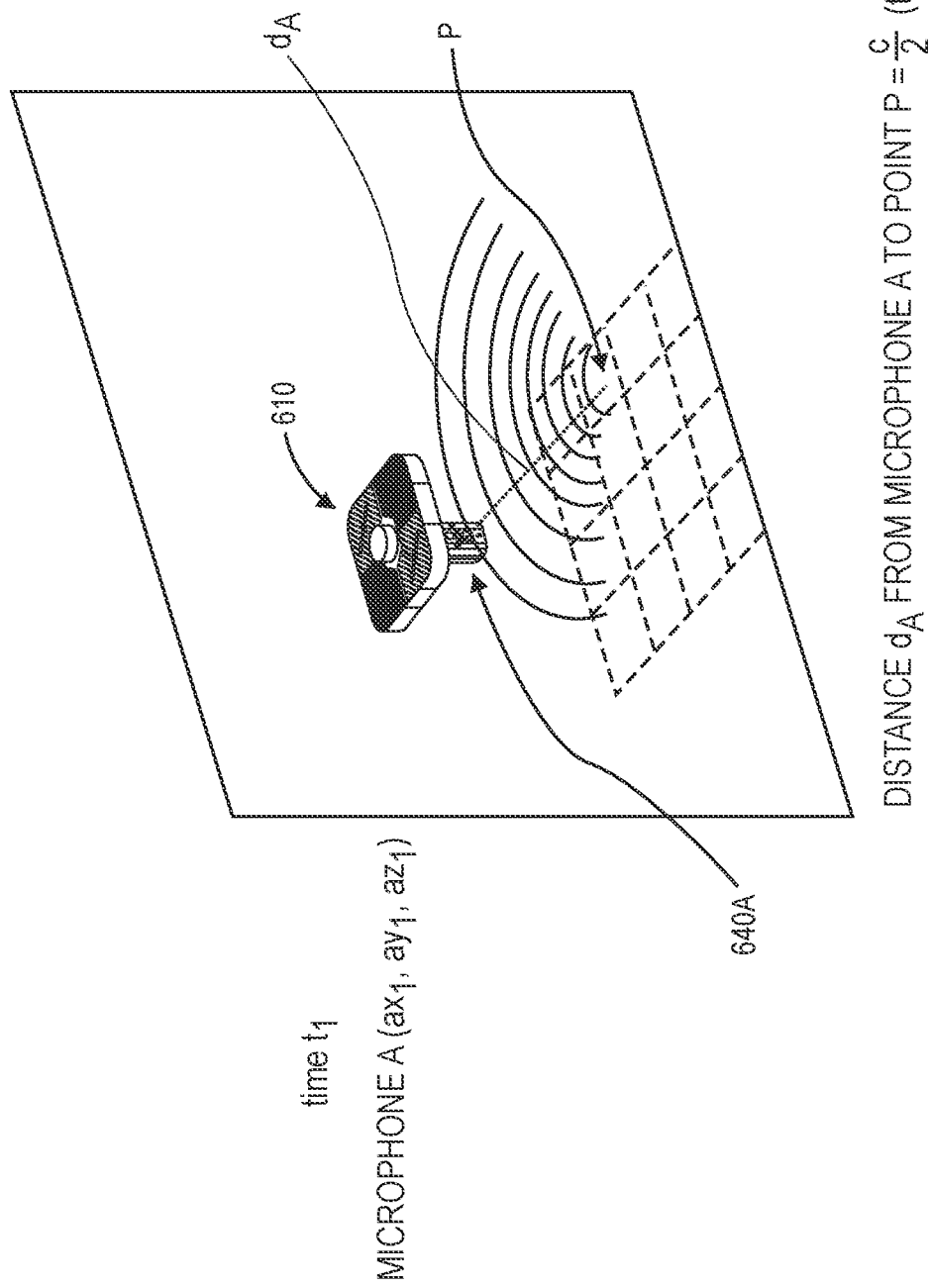

As is shown in FIG. 6B, reflected sound corresponding to the sound emitted at the time $t_0$ is received at the microphone 640A at a time $t_1$. As is described above, a distance $d_A$ between an object P corresponding to the reflection of the sound and the microphone 640A can be determined based on a speed of sound c. In particular, the distance $d_A$ can be calculated as one half of a product of the difference in time $(t_1-t_0)$ and the speed of sound c.

In accordance with implementations of the present disclosure, accuracy of a calculation of the distance $d_A$ may be further improved by taking into account a position of the microphone 640A at the time $t_1$, e.g., a position $(ax_1, ay_1, az_1)$, or, alternatively, a position of the aerial vehicle 610 or a position of the speaker 630. Where a speed of the aerial vehicle 610 remains orders of magnitude less than the speed of sound c, which is common where the aerial vehicle 610 operates within indoor spaces, or for most unmanned aerial vehicles, calculating the distance $d_A$ as one half of a product of the difference in time ($t_1-t_0$) and the speed of sound c remains a sufficiently useful approximation.

Figure 6C:
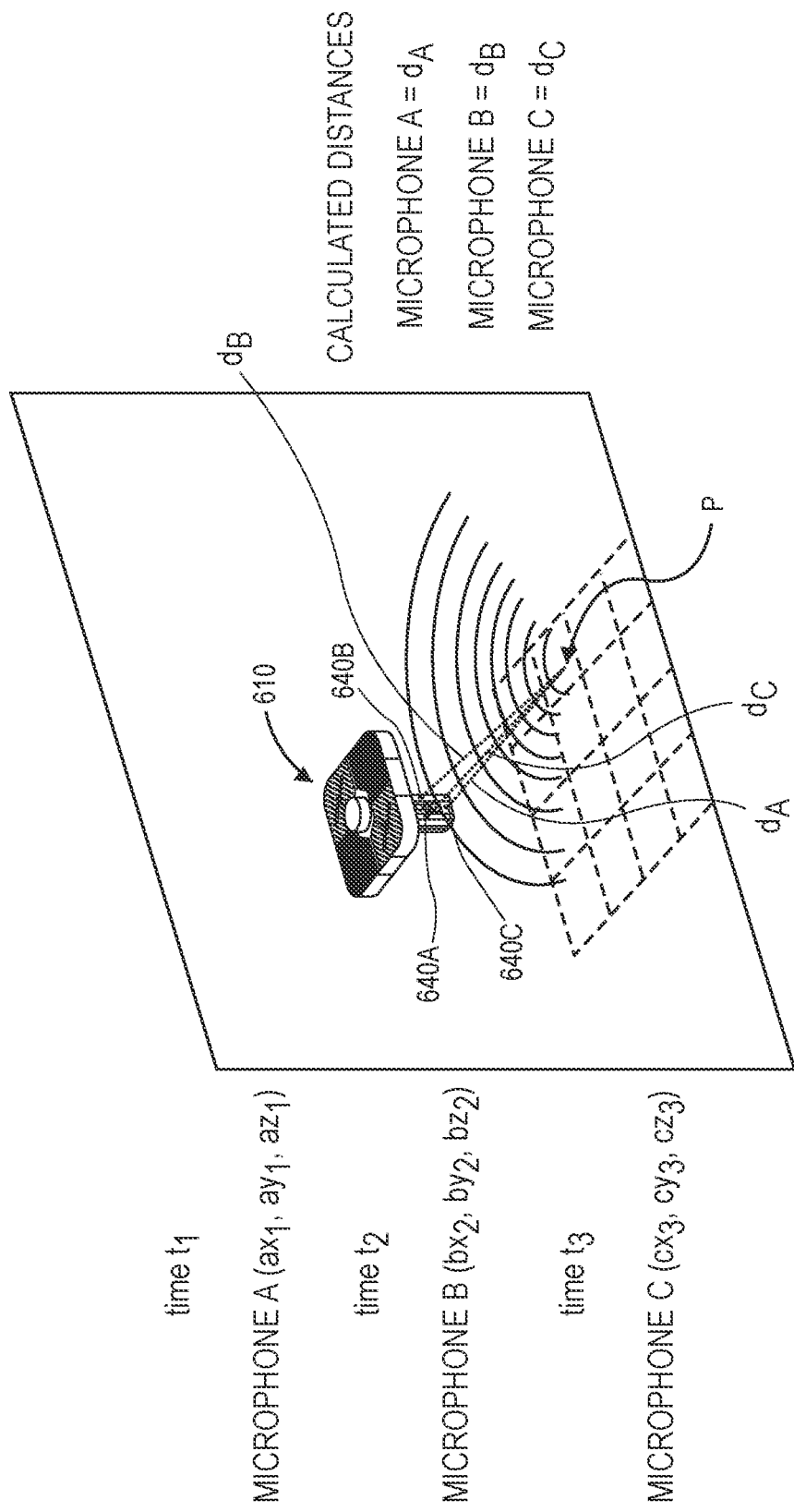

As is shown in FIG. 6C, reflected sound corresponding to the sound emitted at the time $t_0$ is also received at the microphone 640B at a time $t_2$, and at the microphone 640C at a time $t_3$. As with the distance $d_A$, a distance $d_B$ between the object P corresponding to the reflection of the sound and the microphone 640B and a distance $d_C$ between the object P corresponding to the reflection of the sound and the microphone 640C can be determined based on the speed of sound c, e.g., as one half of a product of the difference in time ($t_2-t_0$) and the speed of sound c or as one half of a product of the difference in time ($t_2-t_0$) and the speed of sound c.

As is shown in FIG. 6D, a position of the object P corresponding to the reflected sound can be determined based on the distances $d_A$, $d_B$ and $d_C$. For example, the object P is at a position that is the distance $d_A$ from a position of the microphone 640A at the time $t_1$, is the distance $d_B$ from a position of the microphone 640B at the time $t_2$, and is the distance $d_C$ from a position of the microphone 640C at the time $t_3$. The position of the object P can be characterized, for example, as a position at an intersection of a first sphere with a radius $d_A$ extending from the position of the microphone 640A at the time $t_1$, a second sphere with a radius $d_B$ extending from the position of the microphone 640B at the time $t_2$, and a third sphere with a radius $d_C$ extending from the position of the microphone 640C at the time $t_3$.

A position of the microphone 640A at the time $t_1$ can be located within a first coordinate system at a point ($ax_1$, $ay_1$, $az_1$), and a position of the object P corresponding to the reflected sound can be characterized as being located within the first coordinate system at a point (px, py, pz). As is shown in FIG. 6D, the distance $d_A$ can be calculated or expressed with respect to the position of the microphone 640A and the position of the object P based on a simple three-dimensional application of the Pythagorean theorem.

Figure 6E:
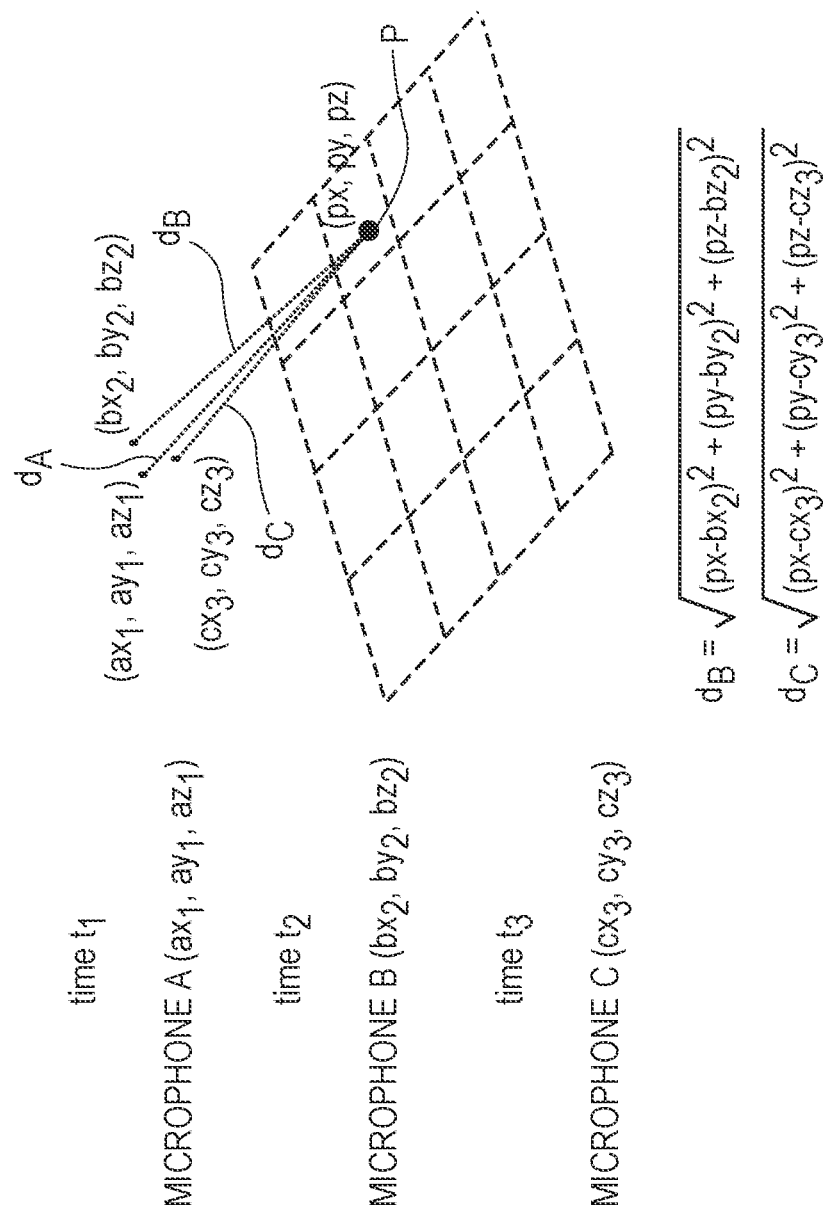

Similarly, as is shown in FIG. 6E, a position of the microphone 640B at the time $t_2$ can be located within the first coordinate system at a point ($bx_2$, $by_2$, $bz_2$), and a position of the microphone 640C at the time $t_3$ can be located within the first coordinate system at a point ($cx_3$, $cy_3$, $cz_3$). As with the distance $d_A$, the distance $d_B$ and the distance $d_C$ can be calculated or expressed with respect to the position of the microphone 640B or the position of the microphone 640C and the position of the object P based on simple three-dimensional applications of the Pythagorean theorem.

As is shown in FIG. 6F, to facilitate and simplify determination of the point (px, py, pz), the position of the microphone 640A at the time $t_1$ in the first coordinate system can be characterized as an origin (0, 0, 0) of the first coordinate system. The positions of the microphone 640A at the time $t_1$, the microphone 640B at the time $t_2$ and the microphone 640B at the time $t_3$ can be characterized as defining a plane, with a vector from the position of the microphone 640A at the time $t_1$ to the position of the microphone 640B at the time $t_2$ representing a displacement of bx units along an x-axis of the first coordinate system, and a vector from the position of the microphone 640A at the time $t_1$ to the position of the microphone 640C at the time $t_3$ representing a displacement of cx units along the x-axis of the first coordinate system and cy units along the y-axis of the first coordinate system. Accordingly, where the position of the microphone 640A at the time $t_1$ is located within the first coordinate system at the point (0, 0, 0), the position of the microphone 640B at the time $t_2$ is located within the first coordinate system at point (bx, 0, 0), and the position of the microphone 640C at the time $t_3$ is located within the first coordinate system at point (cx, cy, 0).

Therefore, within the first coordinate system, the distances $d_A$, $d_B$, $d_C$ can be calculated or expressed with respect to the positions of the microphones 640A, 640B, 640C based on simple three-dimensional applications of the Pythagorean theorem, as is shown in FIG. 6F, where squared values $d_A^2$, $d_B^2$, $d_C^2$ of the distances $d_A$, $d_B$, $d_C$ are depicted. For example, where the position of the microphone 640A within the first coordinate system is at the point (0, 0, 0), where the position of the microphone 640B within the first coordinate system is at the point (bx, 0, 0), where the position of the microphone 640C within the first coordinate system is at the point (cx, cy, 0), and where the position of the object P within the first coordinate system is at the point (px, py, pz), the squared value of the distance $d_A^2$ is equal to a sum of $(px-0)^2$, $(py-0)^2$ and $(pz-0)^2$. Similarly, the squared value of the distance $d_B^2$ is equal to a sum of $(px-bx)^2$, $(py-0)^2$ and $(pz-0)^2$, and the squared value of the distance $d_C^2$ is equal to a sum of $(px-cx)^2$ $(py-cy)^2$ and $(pz-0)^2$.

The position of the object P at the point (px, py, pz) may be resolved based on the distances $d_A$, $d_B$, $d_C$. As is shown in FIG. 6G, the equations for determining the squared values $d_A^2$, $d_B^2$, $d_C^2$ of the distances $d_A$, $d_B$, $d_C$ shown in FIG. 6F may be simplified to account for the positions of the microphones 640A, 640B, 640C, such that the squared value of the distance $d_A^2=px^2+py^2+pz^2$, $d_B^2=(px-bx)^2+py^2+pz^2$, and $d_C^2=(px-cx)^2+(py-cy)^2+pz^2$.

Figure 6H:
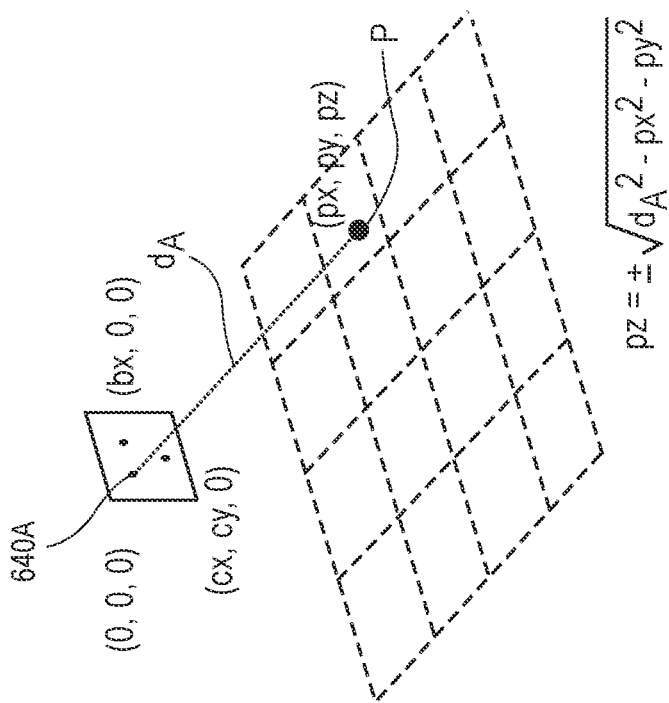
Figure 6G:
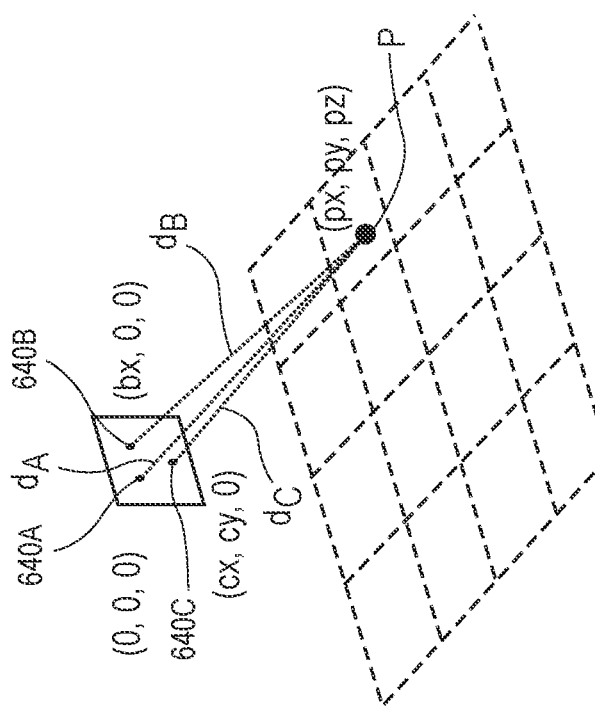

As is shown in FIG. 6H, the equation $d_A^2=px^2+py^2+pz^2$ may be utilized to solve for pz with respect to px and py, or $$pz=\pm\sqrt{d_A^2-px^2-py^2}$$

Figure 6J:
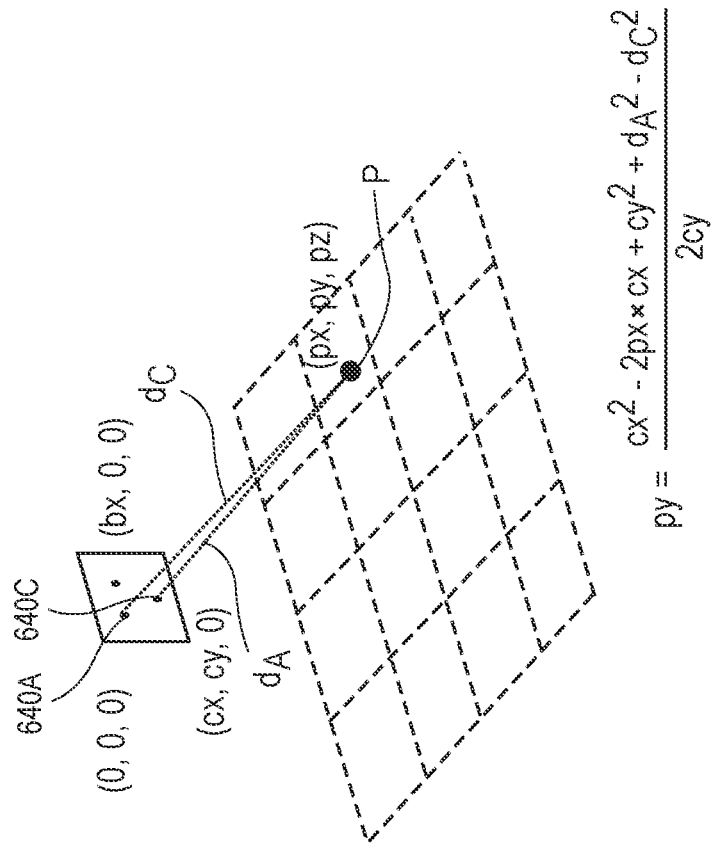
Figure 6I:
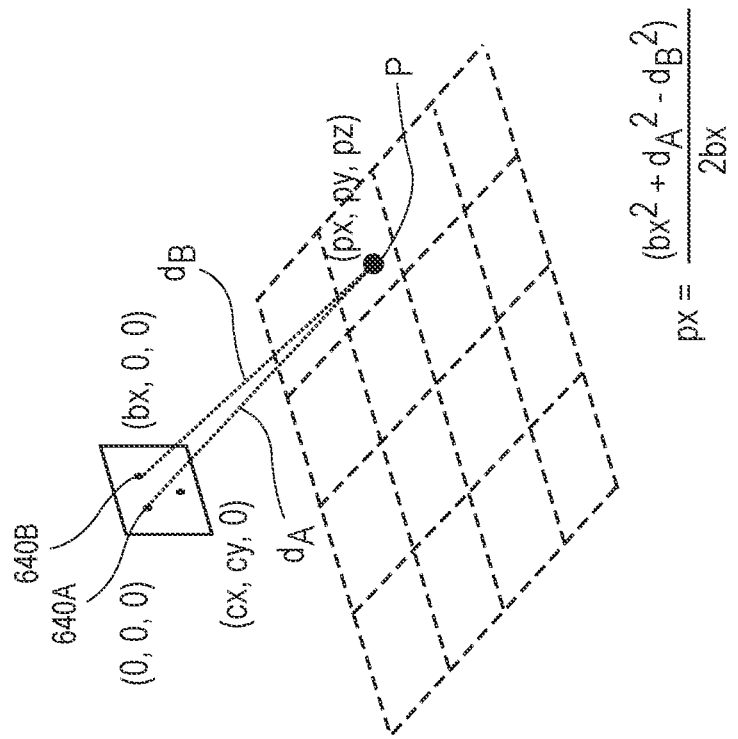

As is shown in FIG. 6I, the equation $d_B^2=(px-bx)^2+py^2+pz^2$ may be used to solve for px, by substituting the equation above for pz, or $$px=(bx^2+d_A^2-d_B^2)/2bx$$

As is shown in FIG. 6J, the equation $d_C^2=(px-cx)^2+(py-cy)^2+pz^2$ may also be used to solve for py, by substituting the equation above for pz, or $$py=(cx^2-2px \cdot cx+cy^2+d_A^2-d_C^2)/2cy$$

Figure 6K:
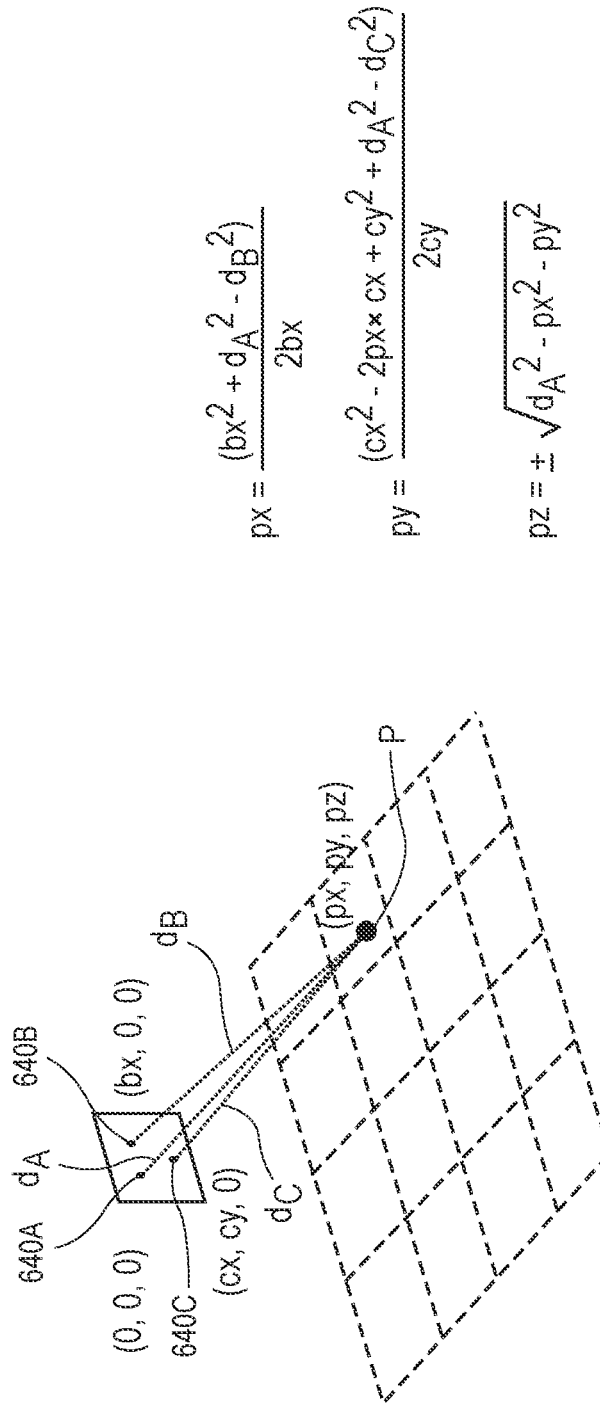

As is shown in FIG. 6K, a solution for the position of the object P, or the point (px, py, pz), may be determined based on the distances $d_A$, $d_B$ and $d_C$, the known displacement bx from the position of the microphone 640A at the time $t_1$ to the position of the microphone 640B at the time $t_2$ along the x-axis of the first coordinate system, and the known displacement cx, cy from the position of the microphone 640A at the time $t_1$ to the position of the microphone 640C at the time $t_3$ along the x-axis and the y-axis of the first coordinate system.

Figure 6L:
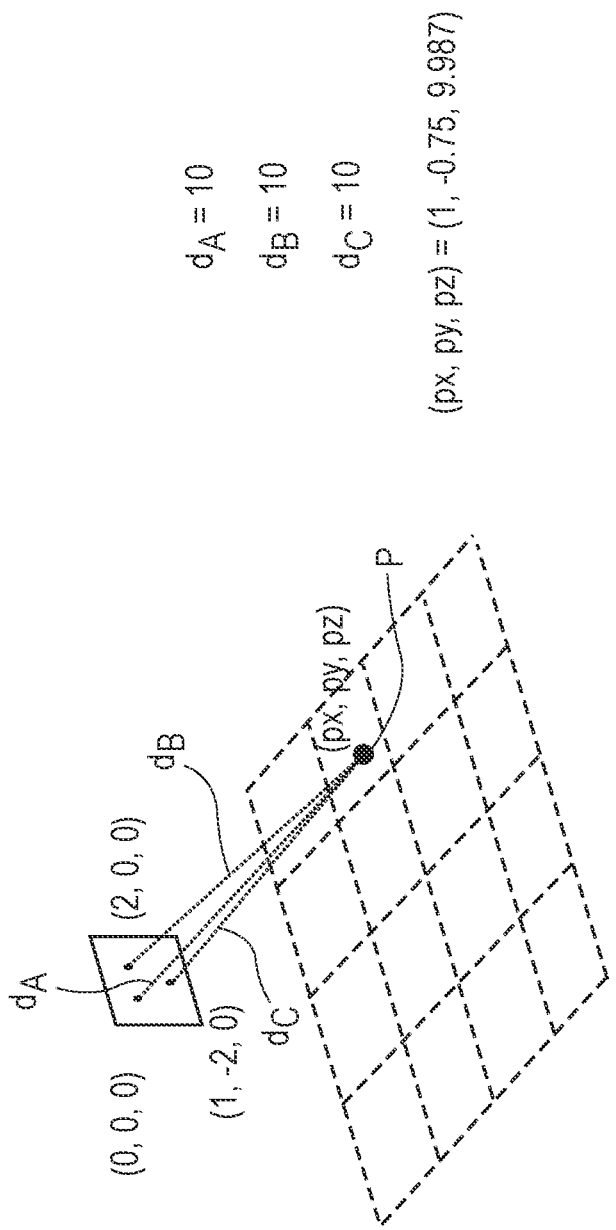

As is shown in FIG. 6L, the equations of FIG. 6K may be used to determine a position (px, py, pz) of the object P where each of the distances $d_A$, $d_B$ and $d_C$ are determined to be equal to ten. The position (px, py, pz) of the object P in the first coordinate system, relative to the position of the microphone 640A at the time $t_1$, may be utilized to determine a current bearing and range to the object P corresponding to the received reflections at the time $t_1$, e.g. via one or more geometric operations. Additionally, the position (px, py, pz) of the object P in the first coordinate system may also be utilized to determine a position of the object P in a second coordinate system, e.g., via one or more matrix transforms.

Referring to FIGS. 7A through 7E, views of aspects of one system in accordance with embodiments of the present disclosure are shown. Except where otherwise noted, reference numerals preceded by the number "7" shown in FIGS. 7A through 7E indicate components or features that are similar to components or features having reference numerals preceded by the number "6" shown in FIGS. 6A through 6L, by the number "4" shown in FIGS. 4A through 4C, by the number "2" shown in FIG. 2 or by the number "1" shown in FIGS. 1A through 1G.

Figure 7A:
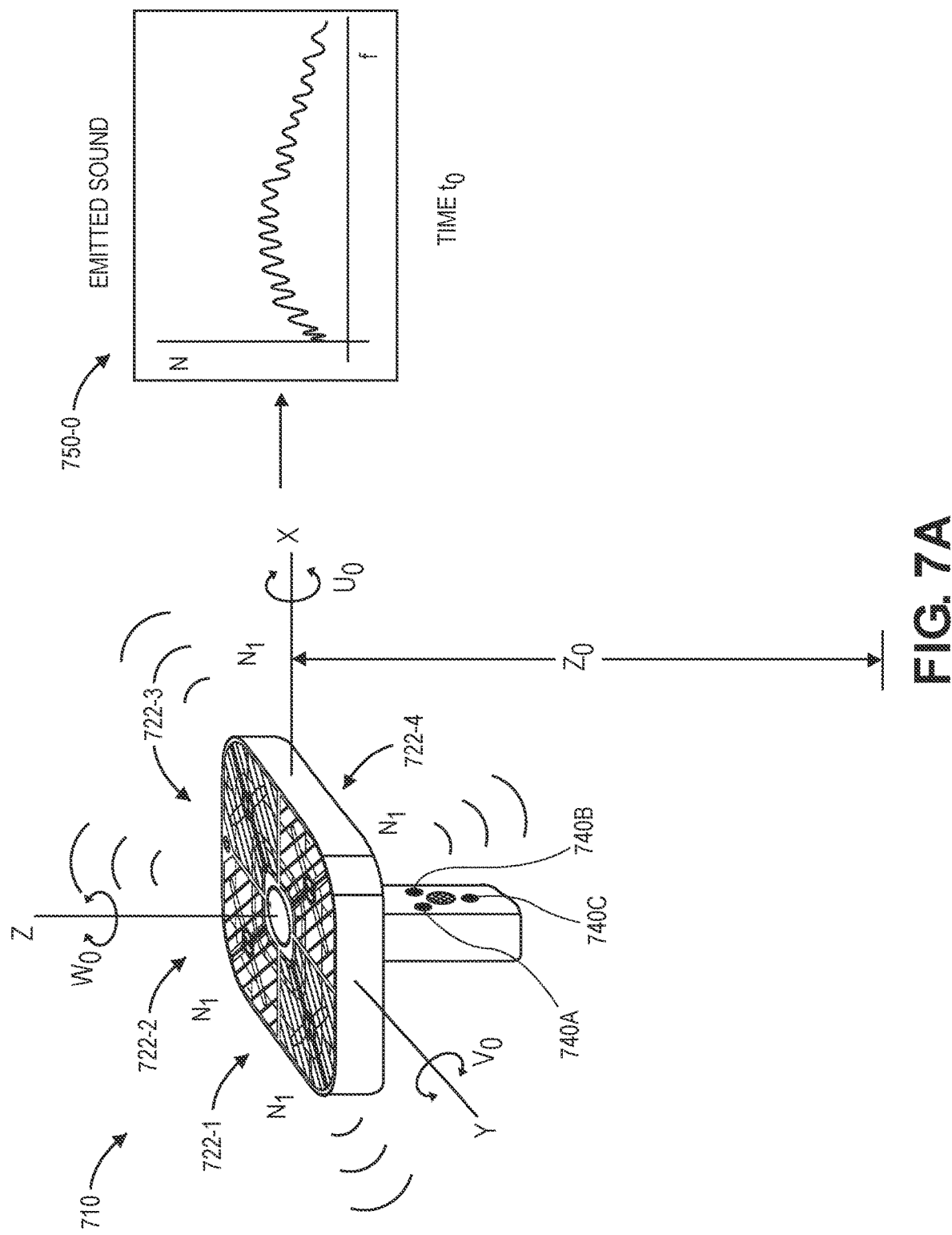
FIGS. 7A through 7E are views of aspects of one system in accordance with embodiments of the present disclosure.

As is shown in FIG. 7A, an aerial vehicle 710 is engaged in airborne operations at an altitude $z_0$. The aerial vehicle 710 includes a plurality of propulsion motors 722-1, 722-2, 722-3, 722-4 and a plurality of microphones (or other acoustic sensors) 740A, 740B, 740C. Each of the propulsion motors 722-1, 722-2, 722-3, 722-4 is operating in tandem at a first operational speed $N_1$ at a time $t_0$, in order to provide adequate lift and/or thrust to maintain the aerial vehicle 710 aloft at the altitude $z_0$. With respect to a set of principal axes, the aerial vehicle 710 is oriented at a first roll angle $u_0$ about an x-axis, a first pitch angle $v_0$ about ay-axis and a first yaw angle $w_0$ about a z-axis.

In the operational configuration shown in FIG. 7A, the aerial vehicle 710 emits sounds 750-0 at varying intensities over a range of frequencies, e.g., broadband sounds or tonals, at the time $t_0$.

Figure 7B:
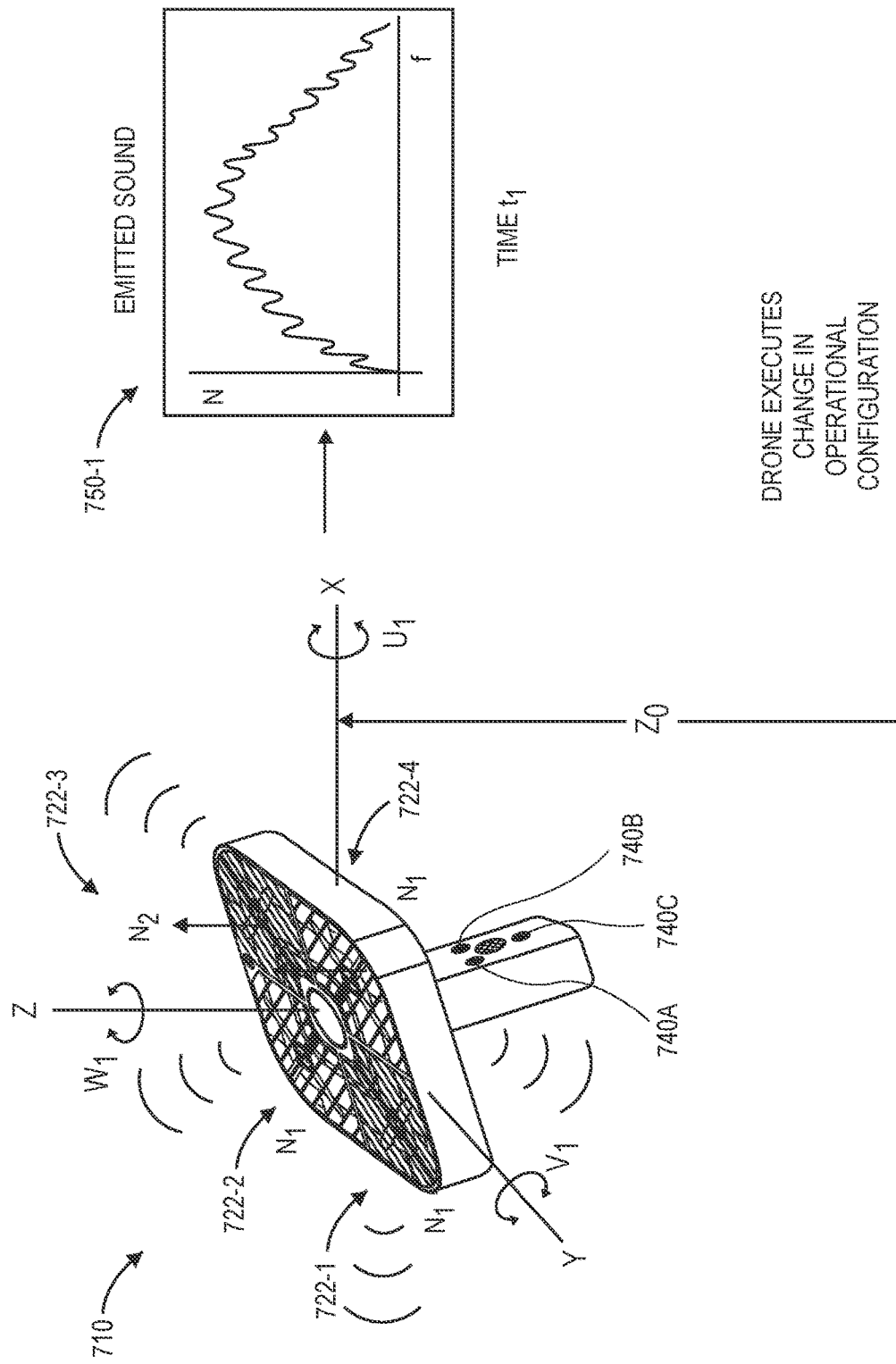

As is shown in FIG. 7B, the aerial vehicle 710 executes a change in an operational configuration of the aerial vehicle 710 at a time $t_1$, and increases an operating speed of the propulsion motor 722-3 to a second operational speed $N_2$, while maintaining the operating speeds of the propulsion motors 722-1, 722-2, 722-4 at the first operational speed $N_1$. As a temporary result of the increase in operating speed of the propulsion motor 722-3, the aerial vehicle 710 is oriented at a second roll angle $u_1$ about the x-axis, a second pitch angle $v_1$ about the y-axis and a second yaw angle $w_1$ about the z-axis. As another temporary result of the increase in operating speed of the propulsion motor 722-3, the aerial vehicle 710 emits sounds 750-1 at greater intensities over the range of frequencies prior to the time $t_0$. The change in the operational configuration of the aerial vehicle 710 shown in FIG. 7B, e.g., by an increase in an operating speed of the propulsion motor 722-3, may occur at a scheduled time, such as at a regular interval of time, or in accordance with the execution of one or more sets of instructions, or for any other reason. Alternatively, the aerial vehicle may execute a change in the operational configuration of the aerial vehicle 710 at the time $t_1$ in any other manner, such as by increasing or decreasing operational speeds of any of the other propulsion motors 722-1, 722-2, 722-4, or operating any other systems provided aboard the aerial vehicle 710.

Figure 7C:
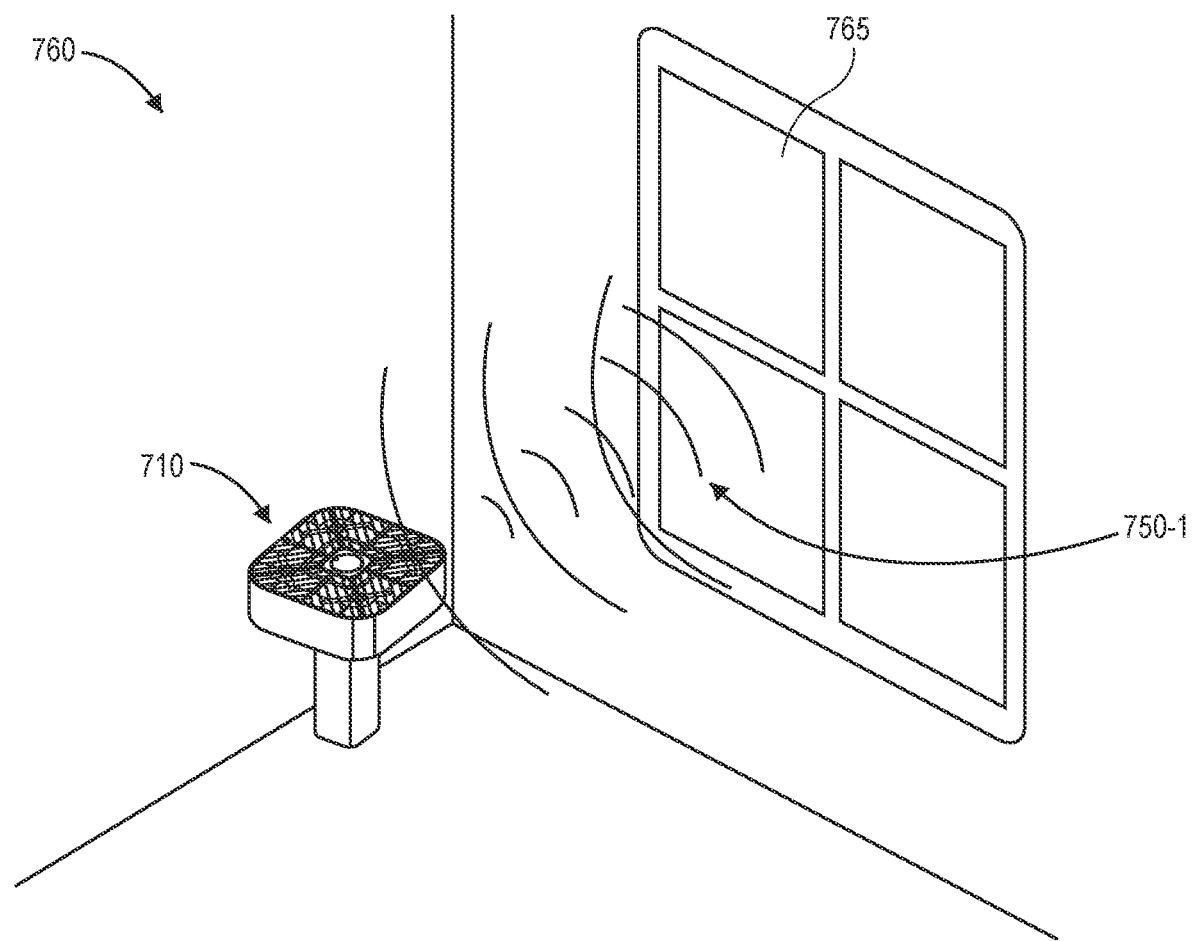

As is shown in FIG. 7C, the aerial vehicle 710 emits the sounds 750-1 into a room 760 or another space in which the aerial vehicle 710 is operating. The sounds 750-1 reflect off one or more surfaces within the room 760, e.g., a window 765 having one or more panes of glass or other features, and are reflected or scattered back toward the aerial vehicle 710. Raw acoustic data representing reflections of the sounds from a nearest object, viz., the window 765, may be captured by the microphones 740A, 740B, 740C.

Figure 7D:
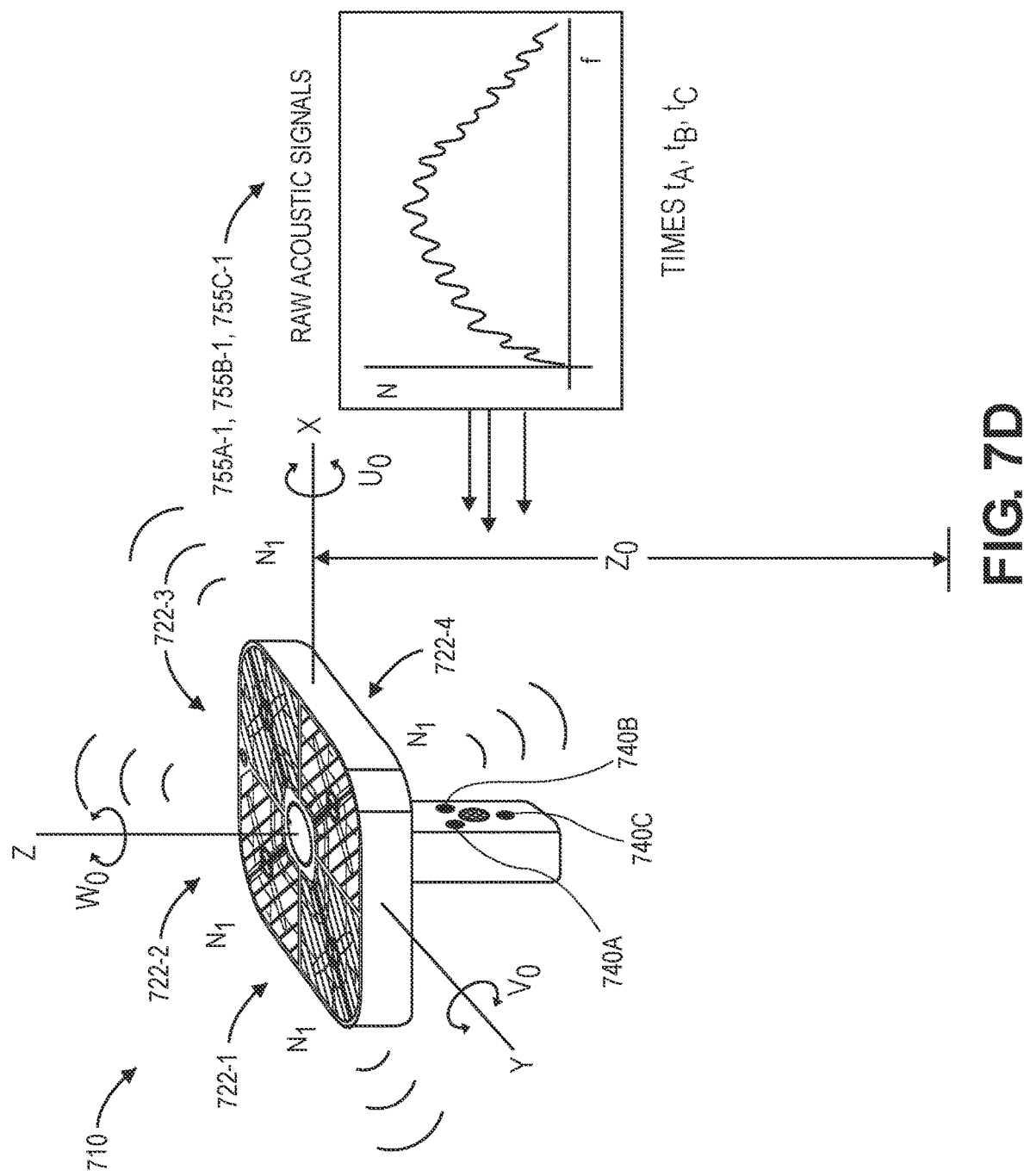

As is shown in FIG. 7D, the aerial vehicle 710 captures raw acoustic data 755A-1, 755B-1, 755C-1 representing reflections of the sounds 750-1 (e.g., echoes) at different times $t_A$, $t_B$, $t_C$, where the microphones 740A, 740B, 740C are located at different positions with respect to the surfaces from which the sounds were reflected. The raw acoustic data 755A-1, 755B-1, 755C-1 may be determined to correspond with reflections of the sounds 750-1 emitted at time $t_1$ in any manner, such as by matching frequencies, amplitudes, intensities, or other attributes of the raw acoustic data 755A-1, 755B-1, 755C-1 to the sounds 750-1. Moreover, the raw acoustic data 755A-1, 755B-1, 755C-1 may be processed to exclude impacts to effects of ambient noise levels, or to reconstruct an audio signal using one or more machine learning algorithms, systems or techniques, e.g., an artificial neural network.

For example, in some implementations, the raw acoustic data 755A-1, 755B-1, 755C-1 may be provided to a machine learning model (e.g., an algorithm, a system or a technique) that is executed by one or more processor units provided aboard the aerial vehicle 710. As is shown in FIG. 7E, the raw acoustic data 755A-1, 755B-1, 755C-1 captured by the microphones 740A, 740B, 740C may be provided separately to an autoencoder 712-1 that is configured to encode the raw acoustic data 755A-1, 755B-1, 755C-1, and to decode the raw acoustic data 755A-1, 755B-1, 755C-1 to represent acoustic signals as if such signals had been emitted in "open space." The autoencoder 712-1 may be trained based on acoustic data representing sounds emitted by the aerial vehicle in an open space, e.g., an outdoor space, or an indoor space having no nearby objects, or comparatively few nearby objects.

Figure 7E:
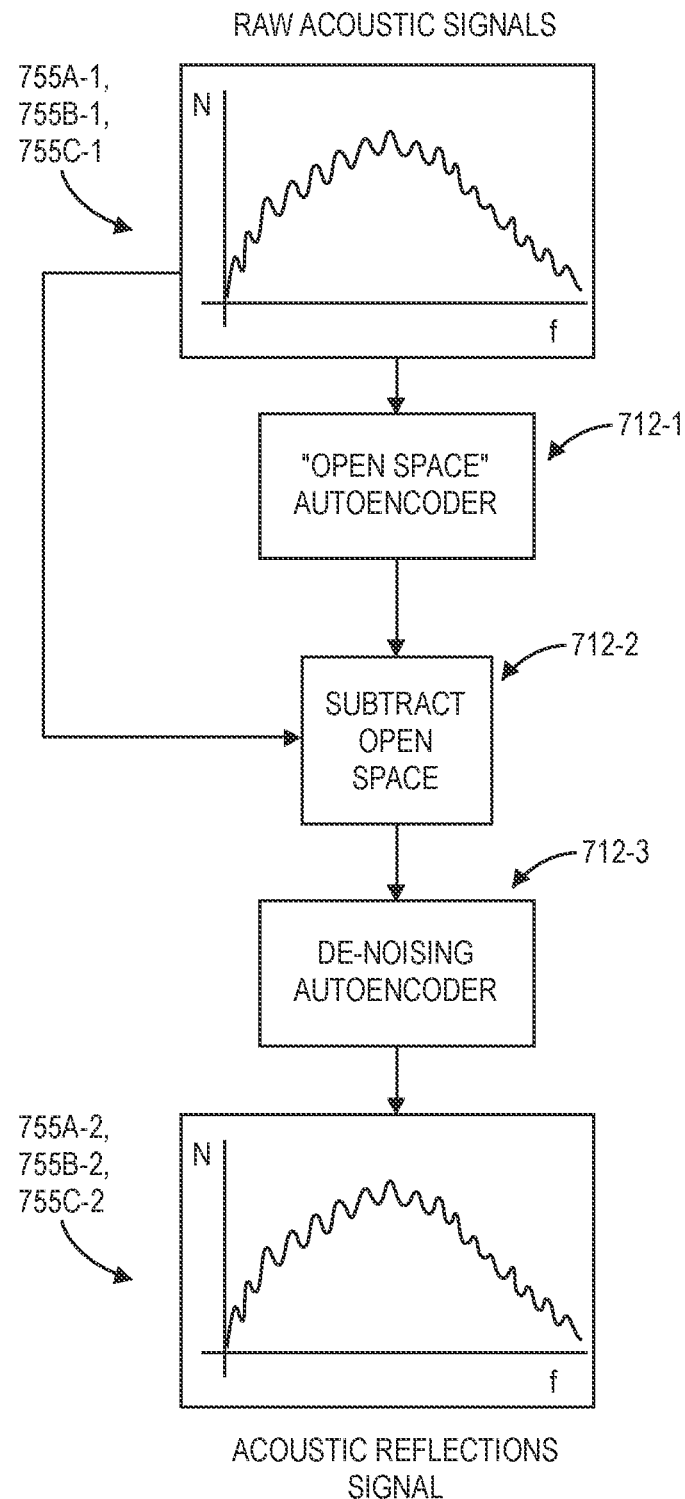

As is further shown in FIG. 7E, outputs received from the autoencoder 712-1 may be provided as inputs to a subtraction module 712-2 that is configured to subtract the "open space" signals so identified from the raw acoustic data 755A-1, 755B-1, 755C-1. Subsequently, and optionally, outputs received from the subtraction module 712-2 may be provided to an autoencoder 712-3 that is trained to eliminate common ambient noise from acoustic signals. Such ambient noise may relate to emissions of sound from any other source, or reflections of sound that are neither emitted by a speaker or another acoustic emitter of the aerial vehicle. Outputs received from the autoencoder 712-3 may be processed to determine distances, bearings and/or ranges to objects, such as the window 765.

In some implementations, one or more of the autoencoder 712-1, the subtraction module 712-2 or the autoencoder 712-3 may include one or more artificial neural networks (e.g., fully connected neural networks, or convolutional neural networks) that are trained to map acoustic data to desired outputs by adjusting strengths of connections between one or more neurons, which are sometimes called synaptic weights. The autoencoder 712-1, the subtraction module 712-2 or the autoencoder 712-3 may have any number of layers, including an input layer, an output layer, and any number of intervening hidden layers. Each of the neurons in a layer may receive an input and generate an output in accordance with an activation or energy function, with parameters corresponding to the various strengths or synaptic weights.

In some implementations, one or more of the autoencoder 712-1, the subtraction module 712-2 or the autoencoder 712-3 may be a heterogeneous neural network, and each of the neurons within the network may be understood to have different activation or energy functions. The subtraction module 712-2 or the autoencoder 712-3 may be trained by redefining or adjusting strengths or weights of connections between neurons in the various layers of the network, in order to provide an output that most closely approximates or associates with a desired output for a given input to a maximum practicable extent.

In some implementations, one or more of the autoencoder 712-1, the subtraction module 712-2 or the autoencoder 712-3 may be characterized as either a feedforward neural network or a recurrent neural network, and may be fully or partially connected. In a feedforward neural network, e.g., a convolutional neural network, information may specifically flow in one direction from an input layer to an output layer, while in a recurrent neural network, at least a portion of internal representations are propagated to a following stage of inference on a next time window of input, for a purpose of producing estimations that are very close to a target output. Additionally, in a fully connected neural network architecture, each of the neurons in one of the layers is connected to all of the neurons in a subsequent layer. By contrast, in a sparsely connected neural network architecture, a number of connections between neurons is reduced, following a sparsity strategy.

In some implementations one or more of the autoencoder 712-1, the subtraction module 712-2 or the autoencoder 712-3 may be trained in any manner, such as by supervised or unsupervised learning, or by backpropagation, or in any other manner. Once the autoencoder 712-1, the subtraction module 712-2 or the autoencoder 712-3 has been trained to recognize dominant characteristics of an input of a training set, e.g., to associate acoustic data with an emitted sound, one or more samples of acoustic data may be provided to the trained machine learning model, and labels of the acoustic data (e.g., as identifying reflected sound or not identifying reflected sound) may be identified based on outputs received from the machine learning model.

In accordance with one or more implementations of the present disclosure, a microphone or another acoustic sensor may generate a signal based on sound waves, or pressure waves, received at the microphone. Acoustic data, or audio data, representing a set of amplitude values at a given time may be generated by an analog-to-digital converter based on signals generated by the microphone. In some implementations, a signal generated by the microphone may be processed by additional components, such as an operational amplifier, prior to sampling by the analog-to-digital converter.

Acoustic data, or audio data, generated based on signals generated by microphones provided aboard aerial vehicles may be analyzed to identify changes in amplitudes corresponding to changes in sound emitted by the aerial vehicles, e.g., based on a change in an operational configuration of an aerial vehicle, such as a speed of rotation of one or more propellers of the aerial vehicle or a change in a motor intensity of one or more motors of the aerial vehicle.

In accordance with one or more implementations of the present disclosure, a peak of a sound wave is determined based on a change in a slope representing amplitude values from a positive slope (i.e., increasing amplitude values) to a negative slope (i.e., decreasing amplitude values), or vice versa. In accordance with one or more implementations, a peak of a sound wave may be identified by continuously determining a difference between an amplitude value for a sample s and an amplitude value for a sample s−1, e.g., a sample captured prior to the sample s, and comparing the difference to a previously determined difference between an amplitude value for the sample s−1 and an amplitude value for a sample s−2, e.g., a sample captured prior to the sample s−1. For example, if a difference between the amplitude values for the samples s−1 and s−2 is determined to be 0.13, while a difference between the samples s and s−1 is determined to be −0.11, the sample s−1 may be determined to correspond to a peak of the sound wave.

In accordance with one or more implementations of the present disclosure, a peak value may be determined as a difference between an amplitude value at a determined peak and an amplitude value at a centerline (e.g., 0). In accordance with one or more implementations, a peak-to-peak amplitude value may be measured from a determined peak above a centerline to a determined peak below a centerline.

In accordance with one or more implementations of the present disclosure, a change in an intensity of sound emitted by an aerial vehicle, which may be caused by a change in an operational configuration of the aerial vehicle, such as a change in a speed of rotation of propellers of the aerial vehicle, is detected based on a change of peak amplitude values in acoustic data. In accordance with one or more implementations of the present disclosure, a first time associated with a change in intensity may be identified.

Subsequently, first audio data may be processed, e.g., using a machine learning model, to generate second audio data representing an approximation of aerial vehicle noise contained in the first audio data. The second audio data may then be subtracted from the first audio data, such as by subtracting amplitude values of the second audio data at each time t from amplitude values of the first audio data at each corresponding time t, resulting in third audio data that represents reflected aerial vehicle noise. The third audio data may be further processed using one or more machine learning models to attempt to remove ambient noise therefrom, and to isolate the reflected aerial vehicle noise.

In accordance with one or more implementations of the present disclosure, an aerial vehicle may automatically adjust itself periodically based on data generated by a gyroscope, an accelerometer, or another orientation sensor. An adjustment or readjustment may cause a periodic modification of a speed of one or more motors or propellers, and in turn cause a change in an intensity of sound produced by the aerial vehicle. A change in intensity of sound may be detected as a change in an amplitude of peaks in audio data captured using a microphone provided aboard the aerial vehicle. In accordance with one or more implementations of the present disclosure, where a periodic adjustment results in periodic changes in amplitude, a period between such changes may be characterized as a "quiet time," a start of which may be determined based on a lower amplitude value for a peak, or a lack of a peak, for a given amount of time that may be greater than the periodic adjustment rate. A time corresponding to a start of a quiet time, or a time corresponding to the last peak prior to such quiet time, may be identified as a first time, and may be used as a trigger to begin processing received audio data using a machine learning model and searching the processed audio data for reflected sound.

Subsequently, a reflection in processed audio data may be detected based on amplitude values occurring after the first time, e.g., based on amplitudes, amplitude peaks, or changes in amplitude. A time associated with a reflection may be determined based on a first peak having an amplitude greater than a threshold, which may or may not be dynamically determined based on original sound captured by the microphone. A time associated with a reflection may also be determined based on a lower amplitude value for a peak, or a lack of a peak, which may be determined to be a time of a last peak prior to a decrease in amplitude values, or a time of the decrease.

In accordance with one or more implementations of the present disclosure, a reflection of drone noise may be identified based on having amplitude peaks with the same spacing in time as amplitude peaks in original audio data.

In accordance with one or more implementations of the present disclosure, peak amplitude values for sound received at a microphone may be continuously determined, and that an adjustment has occurred may likewise be determined where a difference between a first peak amplitude value and a previously determined peak amplitude value exceeds a threshold. In accordance with one or more implementations of the present disclosure, the threshold may be fixed or dynamically determined, e.g., based on one or more recent peak amplitude values.

In accordance with one or more implementations of the present disclosure, upon determining that an adjustment has occurred, an aerial vehicle may begin processing audio data generated using a microphone using one or more machine learning models. In accordance with one or more implementations of the present disclosure, upon determining that an adjustment has occurred, audio data generated using a microphone may be continuously analyzed to determine that a difference between a peak amplitude value and a previously determined peak amplitude value has fallen below a threshold, which may or may not be equal to a prior threshold, and the audio data generated using the microphone may be processed using one or more machine learning models.

In accordance with one or more implementations of the present disclosure, one or more machine learning models may be utilized to generate, based on first audio data, second audio data representing an approximation of underlying audio in open space. This may be, for example, aerial vehicle noise without reflections, or sound output by a speaker based on a signal representing aerial vehicle noise without reflections. In accordance with one or more implementations of the present disclosure, one or more machine learning models may be trained based on audio data representing aerial vehicle noise without reflections, or sounds captured in an open space area that does not present significant reflections.

Figure 8A:
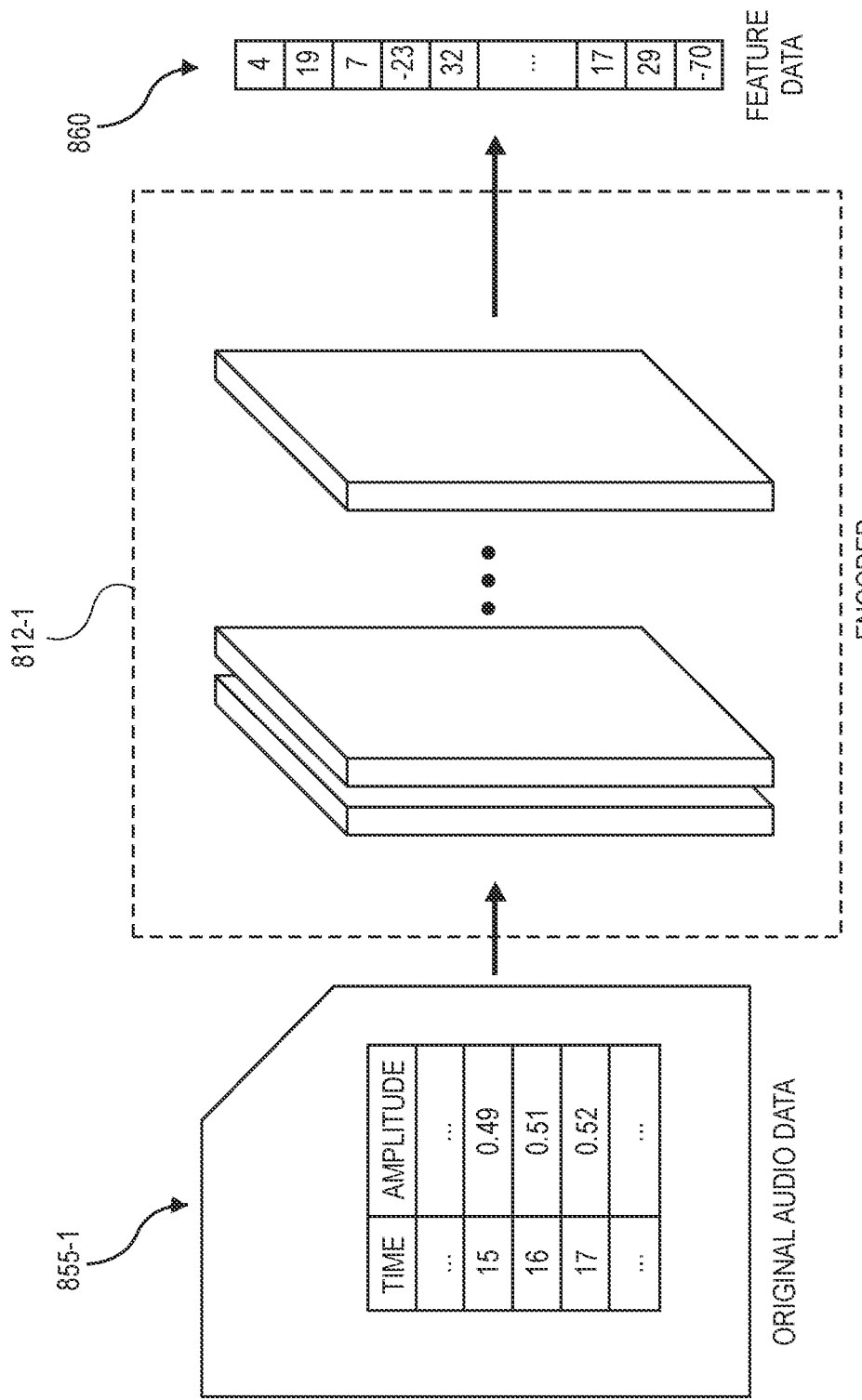
FIGS. 8A through 8C are views of aspects of one system in accordance with embodiments of the present disclosure.
Figure 8B:
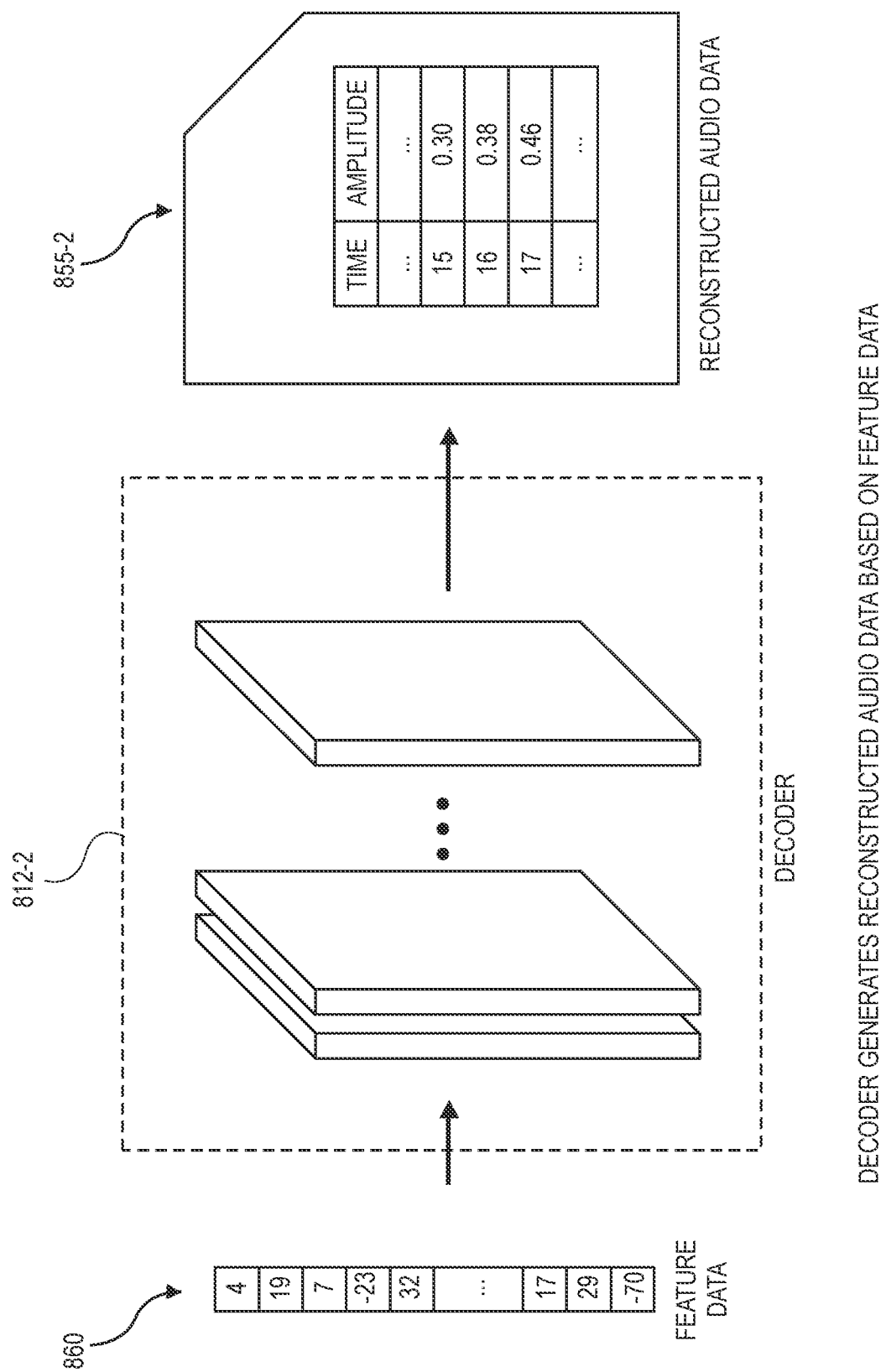
Figure 8C:
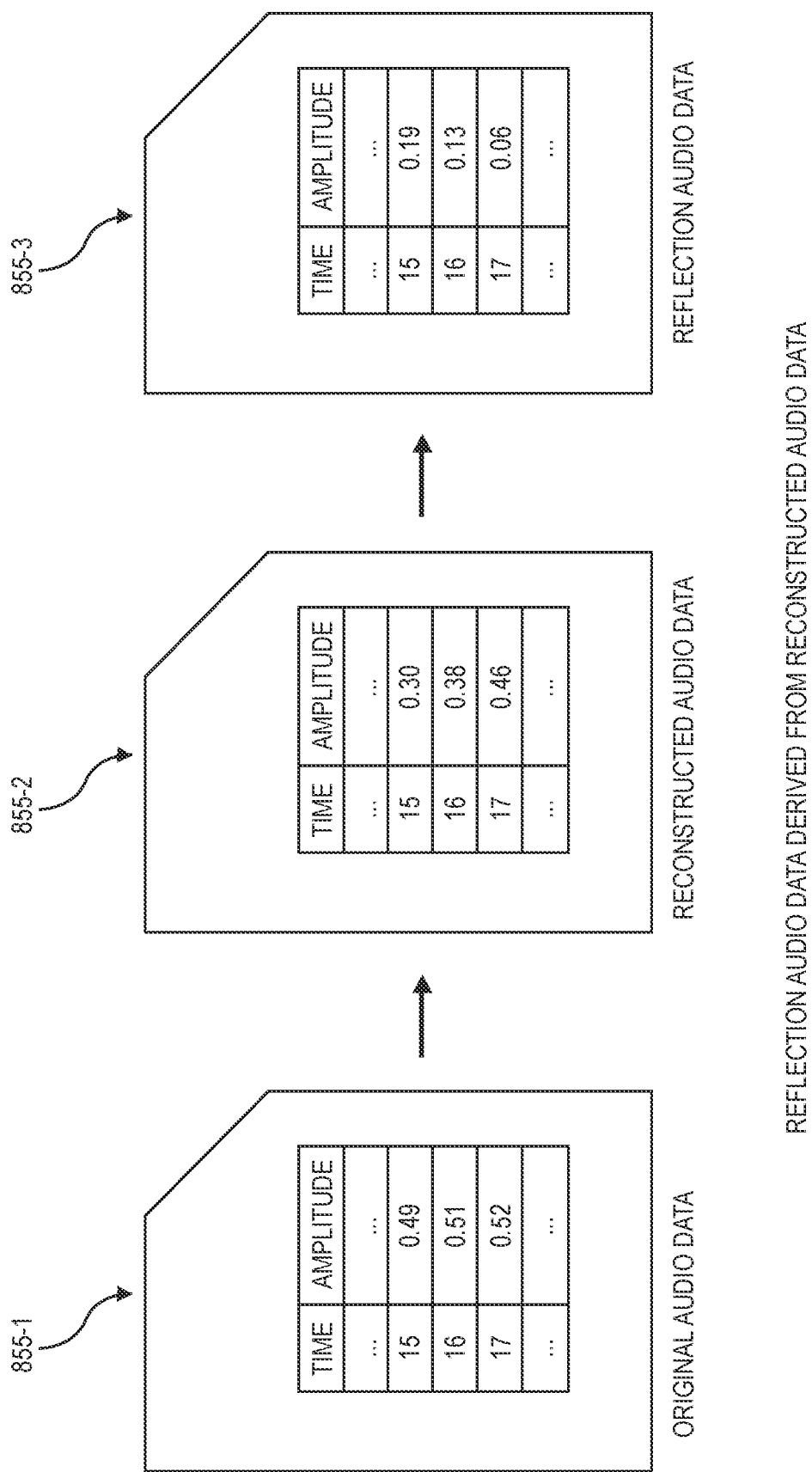

Referring to FIGS. 8A through 8C, views of aspects of one system in accordance with embodiments of the present disclosure are shown. Except where otherwise noted, reference numerals preceded by the number "8" shown in FIGS. 8A through 8C indicate components or features that are similar to components or features having reference numerals preceded by the number "7" shown in FIGS. 7A through 7E, by the number "6" shown in FIGS. 6A through 6L, by the number "4" shown in FIGS. 4A through 4C, by the number "2" shown in FIG. 2 or by the number "1" shown in FIGS. 1A through 1G.

In accordance with one or more implementations of the present disclosure, a first machine learning model 812-1, which may be characterized as an encoder, is trained to encode audio data into feature data, e.g., a feature vector, representative of the audio data. As is shown in FIG. 8A, original audio data 855-1 captured by one or more microphones provided aboard an aerial vehicle is provided to the first machine learning model 812-1 as one or more inputs. The first machine learning model 812-1 generates feature data 860, e.g., a feature vector, representative of the original audio data 855-1 as one or more outputs in response to the inputs.

In accordance with one or more implementations of the present disclosure, a second machine learning model 812-2, which may be characterized as a decoder, is trained to reconstruct audio data from feature data. As is shown in FIG. 8B, the feature data 860 is provided to the second machine learning model 812-2 as one or more inputs. The second machine learning model 812-2 generates reconstructed audio data 855-2 as one or more outputs in response to the inputs.

In accordance with one or more implementations of the present disclosure, the first machine learning model 812-1 may be used to generate feature data from audio data generated while an aerial vehicle is flying in an open space or outdoor area. The audio data and/or the feature data may then be used to train the first machine learning model 812-1 together with audio data generated while an aerial vehicle is flying in indoor spaces that are prone to reflections. In accordance with one or more implementations of the present disclosure, the training data may represent audio data generated by an aerial vehicle that is operating at various speeds, and performing various actions or maneuvers, such as accelerating, decelerating, turning, or others. In accordance with one or more implementations of the present disclosure, an encoder model and a decoder model, e.g., the first machine learning model 812-1 and the second machine learning model 812-2, may be combined as a single model, or may be separate models that are trained or operated together.

In accordance with one or more implementations of the present disclosure, the second machine learning model 812-2 may be to generate, based on feature data, reconstructed audio data 855-2 in open space.

As is shown in FIG. 8C, the reconstructed audio data 855-2 may then be subtracted from the original audio data 855-1 to generate reflected audio data 855-3, which may be further processed, e.g., using one or more machine learning models, to remove ambient noise therefrom.

Figure 9:
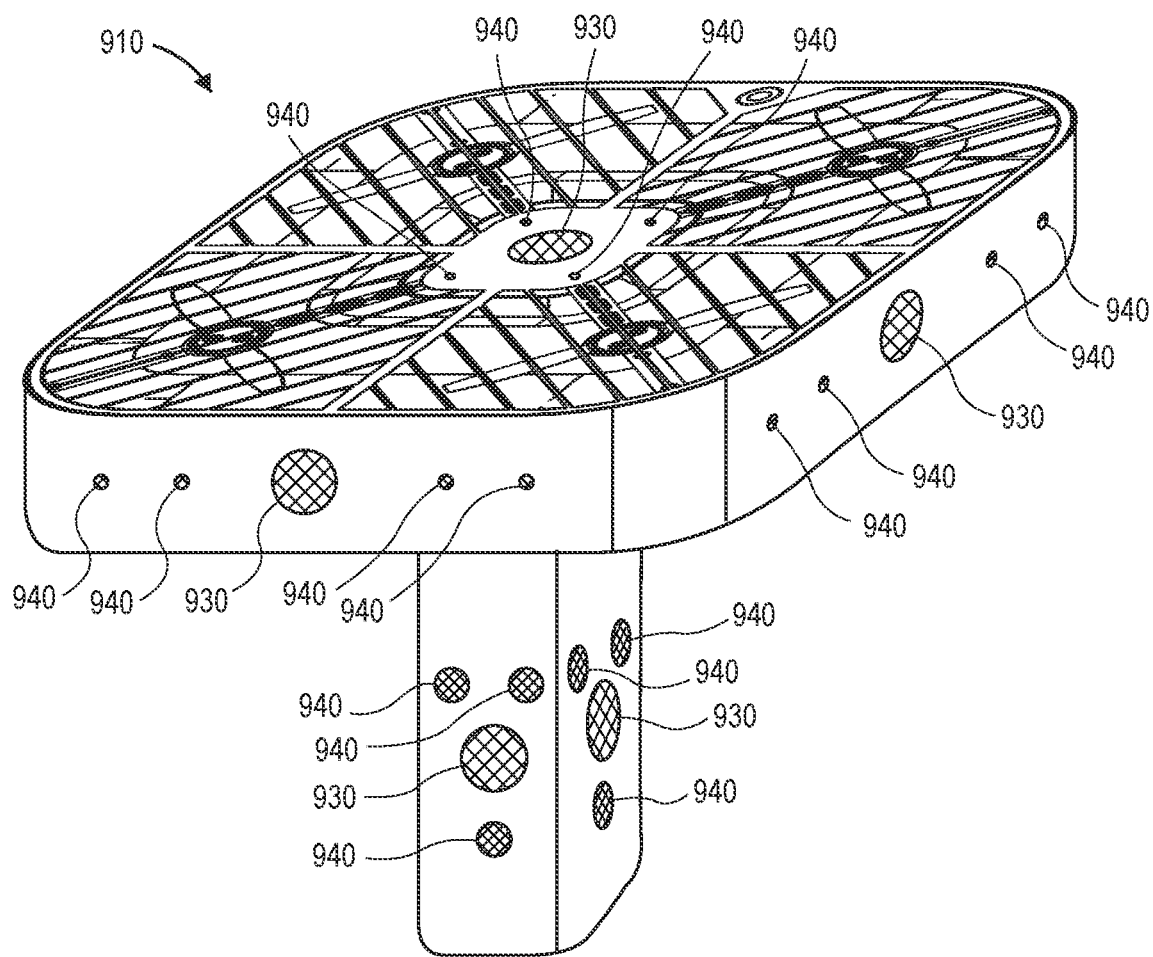
FIG. 9 is a view of aspects of one system in accordance with embodiments of the present disclosure.

Acoustic sensors and emitters may be placed in any location or orientation on an aerial vehicle, and in any number, in accordance with implementations of the present disclosure. Referring to FIG. 9, views of aspects of one system in accordance with embodiments of the present disclosure are shown. Except where otherwise noted, reference numerals preceded by the number "9" shown in FIG. 9 indicate components or features that are similar to components or features having reference numerals preceded by the number "8" shown in FIGS. 8A through 8C, by the number "7" shown in FIGS. 7A through 7E, by the number "6" shown in FIGS. 6A through 6L, by the number "4" shown in FIGS. 4A through 4C, by the number "2" shown in FIG. 2 or by the number "1" shown in FIGS. 1A through 1G.

As is shown in FIG. 9, an aerial vehicle 910 includes a frame, a fuselage and a pair of covers, as well as a plurality of acoustic emitters (e.g., speakers) 930 and a plurality of acoustic sensors (e.g., microphones) 940. The frame of the aerial vehicle 910 may be defined by a plurality of sides (e.g., four sides) and may have a common height, such as a substantially square cross-section in the shape of a square with rounded corners or edges, or a squircle, and a constant height. Additionally, the fuselage of the aerial vehicle 910 comprises a housing or chamber that also has a substantially square cross-section in the shape of a square with rounded corners or edges, or a squircle, and a constant height. A height of the fuselage of the aerial vehicle 910 is greater than a height of the frame of the aerial vehicle 910, and a length or width of the frame is greater than a length or width of the fuselage. The frame and the fuselage of the aerial vehicle 910 may be mounted to one another in a manner that causes a geometric center or centroid of a cross-section of the frame to be aligned along a common axis with a geometric center or centroid of a cross-section of the fuselage. The aerial vehicle 910 may include any number of propulsion motors provided between the covers, as well as any number of sensors, such as a time-of-flight sensor, a LIDAR sensor, or others (not shown) that may be mounted or otherwise provided in any location or orientation with respect to the frame or the fuselage.

Additionally, as is also shown in FIG. 9, the acoustic emitters 930 and the acoustic sensors 940 are distributed throughout the frame and fuselage of the aerial vehicle 910. For example, as is shown in FIG. 9, one of the acoustic emitters 930 is provided at an upper surface of the fuselage or one of the covers of the aerial vehicle 910, substantially on or above a common axis about which the frame and the fuselage are aligned. Four of the acoustic sensors 940 are distributed about the acoustic emitter 930 on the upper surface, at a substantially common distance from the acoustic emitter 930. Sounds emitted by the acoustic emitter 930, e.g., in an upward direction, and reflections of such sounds from any objects provided above the aerial vehicle 910, may be captured by one or more of the acoustic sensors and processed to determine ranges to the objects from which the sounds were reflected.

Additionally, as is further shown in FIG. 9, one of the acoustic emitters 930 and four of the acoustic sensors 940 are provided on sides of the frame of the aerial vehicle 910, at substantially equal intervals from one another. Sounds emitted by the acoustic emitters 930, e.g., in radially outward directions, and reflections of such sounds from any objects provided around the aerial vehicle 910, may be captured by one or more of the acoustic sensors and processed to determine ranges to the objects from which the sounds were reflected. Similarly, as is further shown in FIG. 9, one of the acoustic emitters 930 and four of the acoustic sensors 940 are provided on sides of the frame of the aerial vehicle 910. Sounds emitted by the acoustic emitters 930, e.g., in radially outward directions, and reflections of such sounds from any objects provided around the aerial vehicle 910, may be captured by one or more of the acoustic sensors and processed to determine ranges to the objects from which the sounds were reflected.

The acoustic emitters 930 and acoustic sensors 940 may be provided in any combination or orientation on the aerial vehicle 910, and sounds emitted or sensed thereby may be processed separately or together to determine bearings or ranges to objects in accordance with implementations of the present disclosure.

The contents of U.S. patent application Ser. Nos. 16/584,721 and 17/029,688, and International Patent Application No. PCT/US2020/052268, are incorporated by reference herein in their entireties.

Although some embodiments of the present disclosure show the use of unmanned aerial vehicles in support of one or more applications or functions at a facility such as a home or a like structure, those of ordinary skill in the pertinent arts will realize that the systems and methods of the present disclosure are not so limited. Rather, the systems and methods of the present disclosure may be utilized in connection with any facility, including but not limited to homes, in support of any type of application or function. Moreover, none of the embodiments or implementations described herein is limited to use only by aerial vehicles having structures, geometries or configurations shown in the drawings or described herein.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow chart shown in FIG. 3 or 5, orders in which such methods or processes are presented are not intended to be construed as any limitation on the claimed inventions, and any number of the method or process steps or boxes described herein can be combined in any order and/or in parallel to implement the methods or processes described herein. Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An unmanned aerial vehicle comprising:
   a speaker;
   a first microphone, a second microphone, and a third microphone;
   one or more processors;
   one or more electronically readable media containing processor executable instructions that, when executed by the one or more processors, cause the one or more processors to perform operations comprising:
      generating, using the speaker based at least in part on a first signal, first sound;
      determining a first time associated with the first sound;
      receiving first audio data generated using the first microphone, the first audio data representing the first sound and reflected sound;
      generating, based at least in part on the first audio data and using at least a first machine learning model, second audio data substantially representing the first sound;
      generating, based at least in part on the first audio data and the second audio data, third audio data representing the reflected sound;
      determining, based at least in part on the third audio data, a second time;
      determining a first distance based at least in part on the first time, the second time, and a speed of sound; and
      determining position data for an object based at least in part on the first distance.

2. The unmanned aerial vehicle of claim 1, wherein the one or more electronically readable media contain processor executable instructions that, when executed by the one or more processors, cause the one or more processors to perform operations comprising:
   receiving fourth audio data generated using the first microphone of the unmanned aerial vehicle,
   wherein the first time is determined based at least in part on the fourth audio data,
   wherein the fourth audio data is generated before the first audio data, and
   wherein the first time is before the second time.

3. The unmanned aerial vehicle of claim 1, wherein the first time is determined based at least in part on the first audio data, and
   wherein the first time is before the second time.

4. The unmanned aerial vehicle of claim 1, wherein the one or more electronically readable media contain processor executable instructions that, when executed by the one or more processors, cause the one or more processors to perform operations comprising:
   determining, based at least in part on the third audio data, a change in amplitude, and
   wherein the second time is determined based at least in part on the change in amplitude.

5. The unmanned aerial vehicle of claim 1, wherein the one or more electronically readable media contain processor executable instructions that, when executed by the one or more processors, cause the one or more processors to perform operations comprising:
   receiving fourth audio data generated using the first microphone of the unmanned aerial vehicle;
   determining, based at least in part on the fourth audio data, a first change in amplitude; and
   determining, based at least in part on the third audio data, a second change in amplitude,
   wherein the first time is determined based at least in part on the first change in amplitude,
   wherein the second time is determined based at least in part on the second change in amplitude,
   wherein the second audio data is generated before the first audio data, and
   wherein the second time is before the first time.

6. The unmanned aerial vehicle of claim 1, wherein the first machine learning model comprises at least one of a convolutional neural network or a recurrent neural network.

7. The unmanned aerial vehicle of claim 1, wherein the third audio data is determined at least in part by subtracting a signal represented by the second audio data from a signal represented by the first audio data.

8. The unmanned aerial vehicle of claim 1, wherein amplitude values of the third audio data are determined at least in part by subtracting amplitude values of the second audio data from amplitude values of the first audio data.

9. The unmanned aerial vehicle of claim 1, wherein the one or more electronically readable media contain processor executable instructions that, when executed by the one or more processors, cause the one or more processors to perform operations comprising:
   determining, based at least in part on amplitude values of the third audio data, a peak of the third audio data,
   wherein the first time is determined based at least in part on the peak.

10. The unmanned aerial vehicle of claim 1, wherein the first audio data indicates, for each of a plurality of times, a respective amplitude value,
   wherein the second audio data indicates, for each of a plurality of times, a respective amplitude value, and
   wherein the third audio data indicates, for each of a plurality of times, a respective amplitude value.

11. The unmanned aerial vehicle of claim 1, wherein the one or more electronically readable media contain processor executable instructions that, when executed by the one or more processors, cause the one or more processors to perform operations comprising:
   determining, based on the third audio data, a peak amplitude value; and
   comparing the peak amplitude value to a first threshold,
   wherein the second time is determined based at least in part on the comparing of the peak amplitude value to the first threshold.

12. The unmanned aerial vehicle of claim 1, wherein the one or more electronically readable media contain processor executable instructions that, when executed by the one or more processors, cause the one or more processors to perform operations comprising:

receiving fourth audio data generated using the second microphone of the unmanned aerial vehicle;

generating, based at least in part on the fourth audio data and using the first machine learning model, fifth audio data representing an approximation of the first sound;

generating, based at least in part on the fourth audio data and the fifth audio data, sixth audio data representing reflected sound;

determining, based at least in part on the sixth audio data, a third time;

receiving seventh audio data generated using the third microphone of the unmanned aerial vehicle;

generating, based at least in part on the seventh audio data and using the first machine learning model, eighth audio data representing an approximation of the first sound;

generating, based at least in part on the seventh audio data and the eighth audio data, ninth audio data representing reflected sound;

determining, based at least in part on the ninth audio data, a fourth time;

determining a second distance based at least in part on the third time, a fifth time, and the speed of sound; and determining a third distance based at least in part on the fourth time, a sixth time, and the speed of sound, wherein the position data for the object is determined based at least in part on the first distance, the second distance, and the third distance.

13. The unmanned aerial vehicle of claim 12, wherein the second time, the fifth time, and the sixth time are the same time.

14. The unmanned aerial vehicle of claim 12, wherein the second time is determined based at least in part on audio data generated by the first microphone, wherein the fifth time is determined based at least in part on audio data generated by the second microphone, and wherein the sixth time is determined based at least in part on audio data generated by the third microphone.

15. The unmanned aerial vehicle of claim 1, wherein the one or more electronically readable media contain processor executable instructions that, when executed by the one or more processors, cause the one or more processors to perform operations comprising:

sending a signal to change a speed of rotation of a propeller based at least in part on the position data for the object.

16. The unmanned aerial vehicle of claim 1, wherein the one or more electronically readable media contain processor executable instructions that, when executed by the one or more processors, cause the one or more processors to perform operations comprising:

causing the unmanned aerial vehicle to decelerate based at least in part on the position data for the object.

17. The unmanned aerial vehicle of claim 1, wherein the one or more electronically readable media contain processor executable instructions that, when executed by the one or more processors, cause the one or more processors to perform operations comprising:

causing the unmanned aerial vehicle to change course based at least in part on the position data for the object.

18. The unmanned aerial vehicle of claim 1, wherein the one or more electronically readable media contain processor executable instructions that, when executed by the one or more processors, cause the one or more processors to perform operations comprising:

storing the position data for the object in at least one data store.

19. The unmanned aerial vehicle of claim 1, wherein the one or more electronically readable media contain processor executable instructions that, when executed by the one or more processors, cause the one or more processors to perform operations comprising:

updating a first map based at least in part on the position data for the object.

20. The unmanned aerial vehicle of claim 1, wherein the one or more electronically readable media contain processor executable instructions that, when executed by the one or more processors, cause the one or more processors to perform operations comprising:

generating, based at least in part on the third audio data and using at least a second machine learning model, fourth audio data representing a denoised version of the third audio data.

21. The unmanned aerial vehicle of claim 1, wherein the one or more electronically readable media contain processor executable instructions that, when executed by the one or more processors, cause the one or more processors to perform operations comprising:

determining, based at least in part on the third audio data, a first peak amplitude value;

determining, based at least in part on the third audio data, a second peak amplitude value;

determining a difference between the second peak amplitude value and the first peak amplitude value; and comparing the difference to a first threshold, wherein the second time is determined based at least in part on the comparing of the peak amplitude value to the first threshold.

22. A method comprising:

generating, based at least in part on a first signal using a speaker of an unmanned aerial vehicle, a first sound;

generating first audio data using a first microphone of the unmanned aerial vehicle, wherein the first audio data represents at least the first sound and reflected sound;

generating, based at least in part on the first audio data and using at least a first machine learning model, second audio data representing an approximation of the first sound;

generating, based at least in part on the first audio data and the second audio data, third audio data representing the reflected sound;

determining, based at least in part on the third audio data, a first time;

determining a first distance based at least in part on the first time, a second time, and a speed of sound; and determining position data for an object based at least in part on the first distance.

23. The method of claim 22, further comprising:

determining, based at least in part on the first audio data, the second time, wherein the second time is before the first time.

24. The method of claim 22, further comprising:

determining, based at least in part on the third audio data, a change in amplitude, wherein the first time is determined based at least in part on the change in amplitude.

25. The method of claim 22, further comprising:

generating fourth audio data generated using a second microphone of the unmanned aerial vehicle;

generating, based at least in part on the fourth audio data and using the first machine learning model, fifth audio data representing an approximation of the first sound;

generating, based at least in part on the fourth audio data and the fifth audio data, sixth audio data representing reflected sound;
determining, based at least in part on the sixth audio data, a third time;
generating seventh audio data using a third microphone of the unmanned aerial vehicle;
generating, based at least in part on the seventh audio data and using the first machine learning model, eighth audio data representing an approximation of the first sound;
generating, based at least in part on the seventh audio data and the eighth audio data, ninth audio data representing reflected sound;
determining, based at least in part on the ninth audio data, a fourth time;
determining a second distance based at least in part on the third time, a fifth time, and the speed of sound; and
determining a third distance based at least in part on the fourth time, a sixth time, and the speed of sound,
wherein the position data for the object is determined based at least in part on the first distance, the second distance, and the third distance.

26. The method of claim 22, further comprising:
generating fourth audio data using the first microphone of the unmanned aerial vehicle; and
determining, based at least in part on the fourth audio data, the second time,
wherein the fourth audio data is generated prior to the first audio data, and
wherein the second time is before the first time.

* * * * *